(12) United States Patent
Li et al.

(10) Patent No.: US 9,241,204 B2
(45) Date of Patent: Jan. 19, 2016

(54) TRANSMITTING MULTIPLE ADAPTIVE BIT RATE (ABR) SEGMENT STREAMS ON A SHARED FREQUENCY

(71) Applicant: Broadcom Corporation, Irvine, CA (US)

(72) Inventors: Yong Li, San Diego, CA (US); Bradley Donald Blanche, Aliso Viejo, CA (US); Xuemin Chen, Rancho Santa Fe, CA (US)

(73) Assignee: Broadcom Corporations, Irvine, CA (US)

( * ) Notice: Subject to any disclaimer, the term of this patent is extended or adjusted under 35 U.S.C. 154(b) by 140 days.

(21) Appl. No.: 13/929,696

(22) Filed: Jun. 27, 2013

(65) Prior Publication Data

US 2014/0355624 A1 Dec. 4, 2014

Related U.S. Application Data

(60) Provisional application No. 61/830,010, filed on May 31, 2013.

(51) Int. Cl.
*H04Q 11/04* (2006.01)
*H04L 27/00* (2006.01)
*H04N 21/845* (2011.01)
(Continued)

(52) U.S. Cl.
CPC ............ *H04Q 11/0478* (2013.01); *H04L 27/00* (2013.01); *H04N 21/23439* (2013.01); *H04N 21/26258* (2013.01); *H04N 21/44209* (2013.01);
(Continued)

(58) Field of Classification Search
CPC .................. H04L 41/0896; H04L 2012/5679; H04L 2012/5632; H04L 47/50; H04L 47/6295; H04L 29/06163; H04L 1/0001; H04J 3/1682; H04J 3/16; H04J 3/1694; H04J 9/00
See application file for complete search history.

(56) References Cited

U.S. PATENT DOCUMENTS 6,049,526 A * 4/2000 Radhakrishnan et al. .... 370/229
8,432,884 B1 4/2013 Ashrafi
(Continued)

OTHER PUBLICATIONS

"Space-Time Block Code", retrieved from <http://en.wikipedia.org/w/index.php?title=Space-time_block_code&printable=yes>, Apr. 20, 2013, pp. 1-6.
(Continued)

*Primary Examiner* — Warner Wong
(74) *Attorney, Agent, or Firm* — McDermott Will & Emery LLP

(57) ABSTRACT

A system for transmitting multiple adaptive bit rate (ABR) segment streams on a shared frequency may include an ABR segment generator and transmitter circuitry. The ABR segment generator may encode a content item based at least in part on different ABR profiles to generate encoded streams. The ABR profiles may indicate encoding parameters corresponding to the encoded streams, e.g., bit rates, resolutions, frame rates and/or codecs. The ABR segment generator may be further configured to segment the encoded streams to generate ABR segment streams. The transmitter circuitry may be configured to transmit the ABR segment streams on a shared frequency, such as by transmitting the segment streams over spatially separated antennas, or by applying different orbital angular momentums to the ABR segment streams. In one or more implementations, the system may further include a segment interleaver that is configured to interleave the ABR segment streams.

22 Claims, 19 Drawing Sheets

(51) Int. Cl.
    *H04N 21/2343*    (2011.01)
    *H04N 21/262*     (2011.01)
    *H04N 21/442*     (2011.01)
    *H04N 21/45*      (2011.01)
    *H04N 21/63*      (2011.01)

(52) U.S. Cl.
    CPC ......... *H04N 21/4524* (2013.01); *H04N 21/631* (2013.01); *H04N 21/8456* (2013.01)

(56) References Cited

U.S. PATENT DOCUMENTS

| | | | | |
|---|---|---|---|---|
| 2006/0251025 | A1* | 11/2006 | Kwon et al. | 370/334 |
| 2007/0171811 | A1* | 7/2007 | Lee et al. | 370/208 |
| 2013/0003760 | A1* | 1/2013 | Schwager et al. | 370/537 |
| 2013/0235744 | A1 | 9/2013 | Chen et al. | |
| 2013/0311670 | A1* | 11/2013 | Tarbox et al. | 709/231 |
| 2014/0281000 | A1* | 9/2014 | Dattagupta et al. | 709/231 |
| 2014/0281009 | A1* | 9/2014 | Moorthy et al. | 709/231 |
| 2014/0351318 | A1* | 11/2014 | Friedrich et al. | 709/203 |
| 2014/0359166 | A1* | 12/2014 | Mamidwar et al. | 709/247 |

OTHER PUBLICATIONS

"MIMO MIA! . . . or the Different Faces of MIMO!", Agilent Technologies, Apr. 30, 2009, pp. 1-52.

Palmer, Jason, "'Twisted Light' Data-Boosting Idea Sparks Heated Debate", BBC News Science & Environment, retrieved from <www.bbc.co.uk/news/science-environment-20217938?print=true>, Nov. 7, 2012, pp. 1-3.

"Orbital Angular Momentum Multiplexing", retreived from <http://en.wikipedia.org/wiki/Orbital_angular_momentum_multiplexing>, May 16, 2013, pp. 1-4.

"Space-Time Block Code", retrieved from <http://en.wikipedia.org/w/index.php?title=Spacetime_block_code&printable=yes>, Apr. 20, 2013, pp. 1-6.

"Spatial Multiplexing", retrieved from <http://en.wikipedia.org/w/index.php?title=Spatial_multiplexing&printable=yes>, Mar. 23, 2013, pp. 1-4.

Edfors, Ove, et al., "Is Orbital Angular Momentum (OAM) Based Radio Communication an Unexploited Area?", 2011, pp. 1-8, IEEE Transactions on Antennas and Propagation, Lund University Publications.

Su, Tiehui, et al., "Demonstration of Free Space Coherent Optical Communication Using Integrated Silicon Photonic Orbital Angular Momentum Devices", Apr. 23, 2012, pp. 9396-9402, vol. 20, No. 9, Optics Express.

Djordjevic, Ivan B., et al., "LDPC-Coded Orbital Angular Momentum (OAM) Modulation for Free-Space Optical Communication", Nov. 22, 2010, pp. 24722-24728, vol. 18, No. 24, Optics Express.

Stockhammer, Thomas, "MPEG's Dynamic Adaptive Streaming Over HTTP (DASH)—an Enabling Standard for Internet Tv", Sep. 2011, Qualcomm Incorporated, pp. 1-30.

"MIMO", retrieved from <http://en.wikipedia.org/w/index.php?title=MIMO&printble=yes>, Jun. 19, 2013, pp. 1-10.

Huang, H., et al., "100 Tbit/s Spectral-Efficient Data Link Using Orbital Angular Momentum Multiplexing", Ming Hsieh Department of Electrical Engineering, USC Viterbi School of Engineering, p. 1.

"MIMO MIA!. . . or the Different Faces of MIMO!", Agilent Technologies, Apr. 30, 2009, pp. 1-52.

Muhsin V, "Encoding Many Channels on the Same Frequency Through Radio Vorticity and OAM Techniques", Nov. 2012, pp. 1-34, National Institute of Technology Calicut.

Tamburini, Fabrizio, et al., "Encoding Many Channels in the Same Frequency Through Radio Vorticity: First Experimental Test", Radio Vorticity Channels: Transmission Tests, pp. 1-17.

Mohammadi, Siavoush M., "Orbital Angular Momentum in Radio—A System Study", pp. 1-7, IEEE Transactions on Antennas and Propagation.

Anthony, Sebastian, "Infinite-Capacity Wireless Vortex Beams Carry 2.5 Terabits Per Second", retrieved from <www.extremetech.com/extreme/131640-infinite-capacity-wireless-vortex-beams-carry-2-5-terabits-per-second?print>, Jun. 25, 2012, p. 1.

Wang, Jian, et al., "Terabit Free-Space Data Transmission Employing Orbital Angular Momentum Multiplexing", Jul. 2012, pp. 488-496, vol. 6, Nature Photonics.

"A New Twist for Communications", Jul. 2012, p. 498, vol. 6, Nature Photonics.

Palmer, Jason, "'Twisted Light' Data-Boosting Idea Sparks Heated Debate", BBC News Science & Environment, retrieved from <www.bbc.co.uk/news/science-environment-20217938?print=true>, Nov. 7, 2012, pp. 1-3.

\* cited by examiner

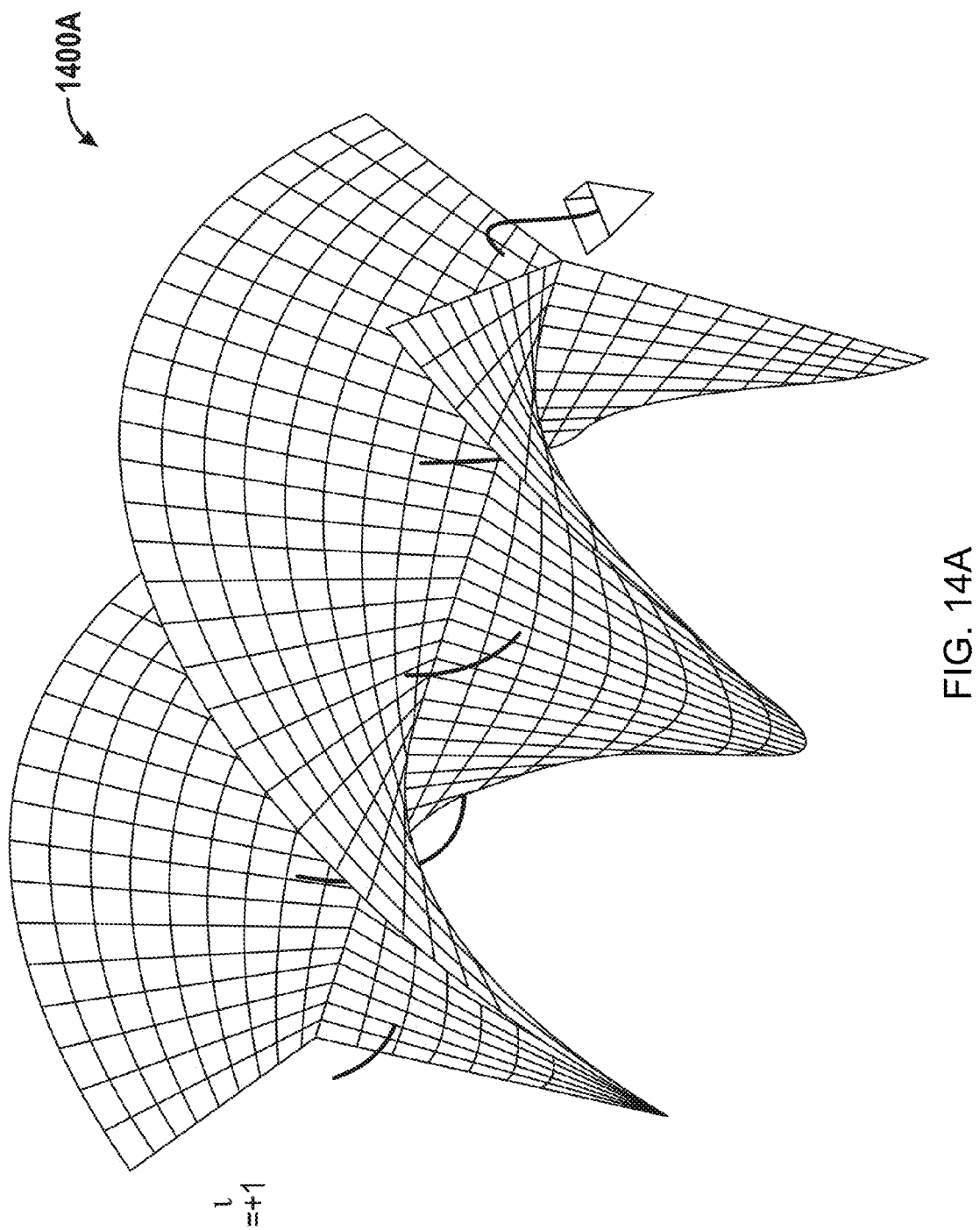

TRANSMITTING MULTIPLE ADAPTIVE BIT RATE (ABR) SEGMENT STREAMS ON A SHARED FREQUENCY

CROSS-REFERENCE TO RELATED APPLICATIONS

The present application claims the benefit of U.S. Provisional Patent Application Ser. No. 61/830,010, entitled "Transmitting Multiple Adaptive Bit Rate (ABR) Segment Streams on a Shared Frequency," filed on May 31, 2013, which is hereby incorporated by reference in its entirety for all purposes.

TECHNICAL FIELD

The present description relates generally to transmitting adaptive bit rate (ABR) segment streams, and more particularly, but not exclusively, to transmitting multiple ABR segment streams on a shared frequency.

BACKGROUND

An adaptive bit rate (ABR) server in a content delivery network (CDN) encodes a content item into multiple streams of different bit rates, with each stream being divided into sequential segments of a given duration (e.g. 2-10 seconds). The ABR server may transmit a manifest file to user devices in a home via a gateway device, such as a home router. The manifest file lists the segments of the content item, the different bit rates at which each segment has been encoded, e.g. different adaptive bit rate profiles for the segment, and a network identifier for accessing each segment, e.g. a uniform resource locator (URL). A user device may request individual ABR segments from the ABR server at the bit rate that is appropriate for the user device, e.g. based on network bandwidth conditions and device capabilities that are determinable by the user device. However, there can be latency and bandwidth requirements associated with a user device requesting ABR segments of a different bit rate to be sent from the ABR server when conditions change.

BRIEF DESCRIPTION OF THE DRAWINGS

Certain features of the subject technology are set forth in the appended claims. However, for purpose of explanation, several embodiments of the subject technology are set forth in the following figures.

FIGS. 14A-C illustrate examples of OAM channels having different orbital angular momentums that may be transmitted on a shared frequency.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
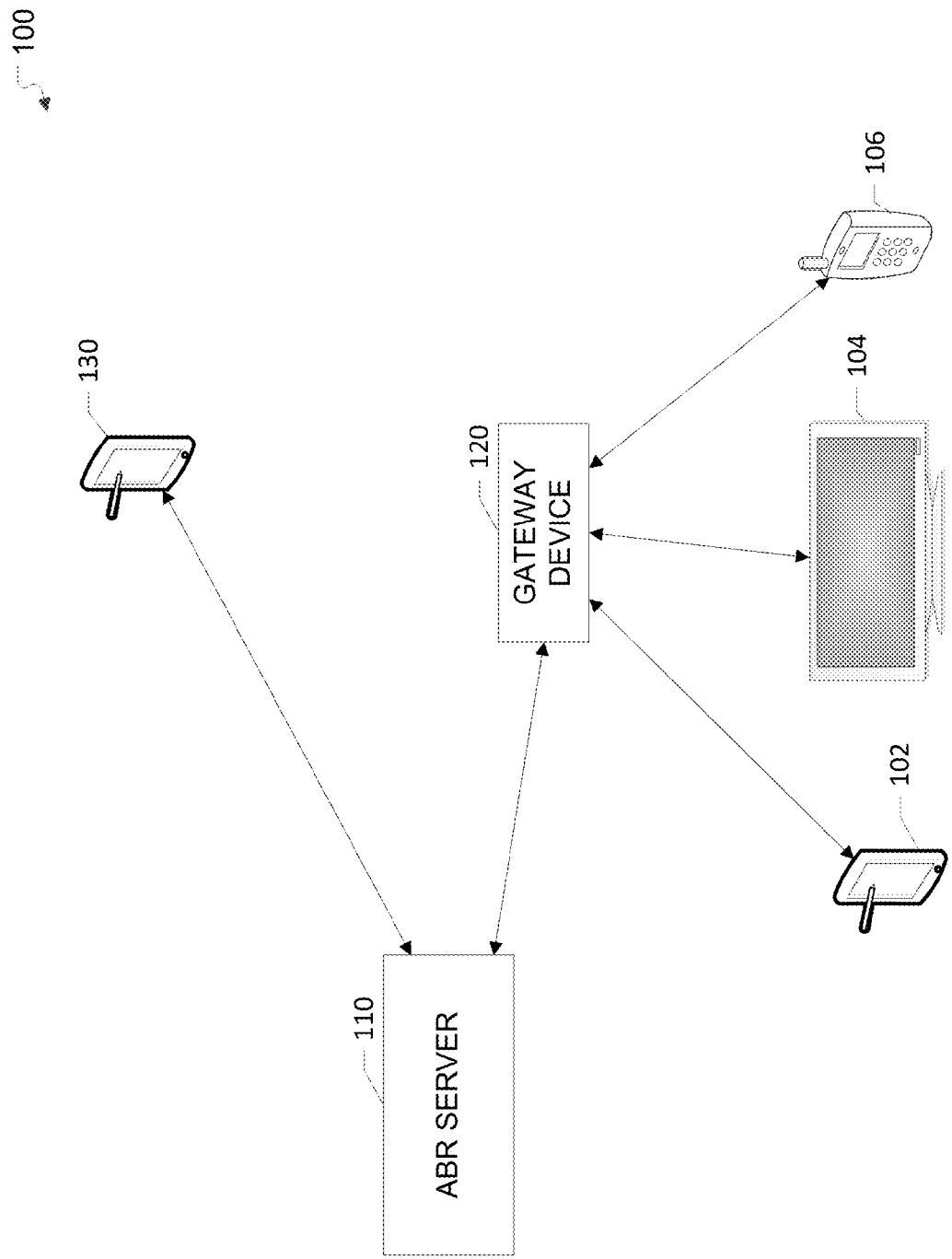
FIG. 1 illustrates an example network environment in which a system for transmitting multiple ABR segment streams on a shared frequency may be implemented in accordance with one or more implementations.

FIG. 1 illustrates an example network environment 100 in which a system for transmitting multiple ABR segment streams on a shared frequency may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes an adaptive bit rate (ABR) server 110, a gateway device 120, and electronic devices 102, 104, 106, 130. The ABR server 110, the gateway device 120, and/or the electronic devices 102, 104, 106, 130 may be in direct wired and/or wireless communication with one another and/or may be communicatively coupled to one another via a wireless and/or wired network. In one or more implementations, the ABR server 110 may be coupled to the gateway device 120 and/or the electronic device 130 via a fiber optic cable, such as a multi-mode fiber optic cable; however, other suitable network media may also be used. The ABR server 110, the gateway device 120, and/or the electronic devices 102, 104, 106, 130 may be, or may include one or more components of, the electronic system discussed below with respect to FIG. 17.

The ABR server 110 may be a single computing device such as a computer server. In another example, ABR server 110 may represent one or more computing devices (such as a cloud of computers and/or a distributed system) that are communicatively coupled, such as communicatively coupled over a network, and that collectively, or individually, perform one or more functions that can be performed server-side, such as transcoding a content item into multiple encoded streams based on multiple bit rates, segmenting the encoded streams, transmitting the segmented encoded streams, and/or generally any functions that can be performed server-side. The ABR server 110 may be coupled with various databases, storage services, or other computing devices.

The ABR server 110 may receive content items for transmission to receiving devices, e.g. as part of a content delivery network. The content items may include multimedia content items, such as video, television programs, movies, web pages or generally any multimedia content items. The ABR server 110 may determine different ABR profiles for encoding the content items, e.g. based on determinable network conditions, channel capabilities, device capabilities, etc. The ABR server 110 may transcode the content items into different encoded streams based at least in part on the ABR profiles. The ABR profiles may indicate one or more encoding characteristics or parameters for encoding the content item, such as bit rate, codec, resolution, frame rate, or generally any encoding characteristics. The ABR server 110 may segment the encoded streams into sequential segments of a given duration (e.g. 2-10 seconds) to generate ABR segments. It is understood that segments of any duration may be selected. In one or more implementations, the ABR server 110 may interleave the ABR segments. The ABR server 110 may transmit the ABR segments, as continuous ABR segment streams, to the electronic device 130, e.g. for rendering to a viewer, and/or the gateway device 120, e.g. for distribution to the electronic devices 102, 104, 106 and/or rendering to a viewer. In one or more implementations, the ABR server 110 may be configured to transmit any number of different ABR segment streams over a shared frequency, such as a single shared transmission frequency, so as to not require multiple different frequencies to transmit the different ABR segment streams.

In one or more implementations, the ABR server 110 may transmit a manifest file to recipient devices of the ABR segment streams, such as the electronic device 130 and/or the gateway device 120. The manifest file may identify the segments of the content item, the different bit rates at which each segment has been encoded, e.g. the different ABR segment streams, and a network identifier for accessing each segment, e.g. a uniform resource locator (URL), or contain other identifying information about the ABR segments. The electronic device 130 and/or the gateway device 120 may then retrieve individual ABR segments that are identified in the manifest file, e.g. alternatively, and/or in addition to, receiving the ABR segment streams.

The ABR server 110 may include, and/or may be coupled to, suitable logic, circuitry, interfaces, memory, and/or code that enables communications, e.g. with the gateway device 120 and/or the electronic device 130, via wired or wireless interfaces and utilizing one or more transceivers. The ABR server 110 may include, and/or may be coupled to, one or more transceivers configured to communicate the ABR segment streams over different channels on a shared frequency or bandwidth. In one or more implementations, the ABR server 110 may include, and/or may be coupled to, one or more transceivers configured to communicate the ABR segment streams over multiple orbital angular momentum (OAM) channels on a shared frequency or bandwidth, which is discussed further below with respect to FIGS. 3, 4, 6, 15 and 16. In one or more implementations, the ABR server 110 may further include, and/or may be coupled to, one or more radio transceivers configured to communicate the ABR segment streams on a shared frequency or bandwidth using multiple-input and multiple-output (MIMO) spatial multiplexing, which is discussed further below with respect to FIGS. 5 and 7.

The gateway device 120 may include a network device, such as a switch or a router, that is configured to couple the electronic devices 102, 104, 106 to the ABR server 110 and/or to an external network, such as the Internet. The gateway device 120 may further include circuitry configurable to render segments of received ABR segment streams on a display, such as a television or a monitor. In one or more implementations, the gateway device 120 may be, or may include, a set-top box. The gateway device 120 may be configured to function as an intermediary, or proxy, between the electronic devices 102, 104, 106 and the ABR server 110.

The gateway device 120 retrieves individual segments of a content item at an appropriate bit rate that is determined based on a measured or desirable parameter, such as the network bandwidth conditions between the gateway device 120 and the ABR server 110, channel characteristics, capabilities of the gateway device 120 or electronic devices 102, 104, 106 connected thereto, and/or the state of processing of ABR segments already received from the ABR server 110. In one or more implementations, the gateway device 120 may further transcode the ABR segments in accordance with one or more adaptive bit rate profiles (e.g., in order to change the bit rate or other encoding characteristics), and may additionally advertise the one or more transcoded adaptive bit rate profiles to the electronic devices 102, 104, 106, e.g. via a manifest file. The electronic devices 102, 104, 106 may retrieve segments from the gateway device 120 at the bit rate that is appropriate for the electronic devices 102, 104, 106, e.g. based on the capabilities of the electronic devices 102, 104, 106 and the network bandwidth conditions between the electronic devices 102, 104, 106 and the gateway device 120 device.

The gateway device 120 may also be configured to receive a plurality of different ABR segment streams for a content item from the ABR server 110 on a shared frequency. In one or more implementations, the gateway device 120 may deinterleave interleaved ABR segment streams and may recover any corrupted segments of any of the ABR segment streams. The recovery of corrupted segments is discussed further below with respect to FIGS. 10, 12, and 13. In one or more implementations, the gateway device 120 may transcode one of the received ABR segment streams to generate an ABR segment stream having a bit rate, or other encoding characteristic, that is different than the received ABR segment streams, e.g. based at least in part on the network conditions between the gateway device 120 and the electronic devices 102, 104, 106. For example, the gateway device 120 may perform such transcoding in order to recover corrupted ABR segments or to generate new ABR segments having different characteristics than those ABR segments received from the ABR server 110. The gateway device 120 may generate a manifest file based on the received ABR segment streams and may transmit the manifest file to the electronic devices 102, 104, 106.

In one or more implementations, the electronic devices 102, 104, 106, 130 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for retrieving and/or segments of a content item, or can be coupled to such a device. In the example of FIG. 1, the electronic devices 102, 130 are depicted as tablet devices, the electronic device 104 is depicted as a television, and the electronic device 106 is depicted as a smart phone.

The electronic devices 102, 104, 106 receive a manifest file from the gateway device 120 that lists ABR segments of a content item and different bit rates (or other encoding characteristics) at which the ABR segments are available, along with a URL for accessing the segments. The electronic devices 102, 104, 106 may retrieve each segment of the content item at the bit rate that is appropriate for the electronic devices 102, 104, 106, respectively, e.g. based on network bandwidth conditions and device capabilities that are determinable by the electronic devices 102, 104, 106, respectively. The electronic devices 102, 104, 106, may render the received segments in sequence, e.g. on a display, in order to reproduce the content item.

The electronic device 130 is configured to receive a plurality of ABR segment streams for a content item from the ABR server 110 on a shared frequency. When an ABR segment stream is interleaved, the electronic device 130 deinterleaves the ABR segment streams and may be configured to recover any corrupted segments of any of the ABR segment streams through use of at least one of another uncorrupted segment from the ABR segment streams. The electronic device 130 may select each segment of the content item to render based on one or more characteristics determinable by the electronic device 130, such as available power, available processing resources, display size, or generally any characteristics determinable by the electronic device 130. For example, the electronic device 130 may render segments that can be decoded with a small amount of power and/or processing resources when the electronic device 130 is running low on power and/or processing resources. In one or more implementations, the electronic device 130 may be configured to receive a manifest file from the ABR server 110 and retrieve one or more individual segments that are listed in the manifest file from the ABR server 110.

The gateway device 120 and/or the electronic device 130 (or any recipient device of ABR streams from the ABR server 110) may include, and/or may be coupled to, suitable logic, circuitry, interfaces, memory, and/or code that enables communications, e.g. with the ABR server 110 and/or the electronic devices 102, 104, 106 via wired or wireless interfaces and utilizing one or more transceivers. In one or more implementations, the gateway device 120 and/or the electronic device 130 may include, and/or may be coupled to, one or more transceivers configured to receive ABR segment streams over multiple orbital angular momentum (OAM) channels on a shared frequency, which is discussed further below with respect to FIGS. 3, 4, 8, 15, and 16. In one or more implementations, the gateway device 120 and/or the electronic device 130 may further include, and/or may be coupled to, one or more radio transceivers configured to receive ABR segment streams on a shared frequency using multiple-input and multiple-output (MIMO) spatial multiplexing, which is discussed further below with respect to FIGS. 5 and 9.

In one or more implementations, the ABR server 110 is configured to send, and the gateway device 120 and/or the electronic device 130 are configured to receive, a plurality of ABR segment streams over the same frequency (i.e., a shared frequency) or, alternatively, over a shared bandwidth. By transmitting a plurality of ABR segment streams, the gateway device 120 and/or the electronic device 130 are provided with the flexibility of selecting an appropriate ABR segment at any given time from the plurality of ABR segment streams, so as to be able to flexibly account for fluctuating conditions using decision making at the gateway device 120 and/or the electronic device 130. This avoids the necessity for the gateway device 120 and/or the electronic device 130 to request a different ABR segment or ABR segment stream with different encoding characteristics from the ABR server 110 when conditions change, thereby reducing latency and bandwidth that would be associated with such back and forth requests between the ABR server 110 and the gateway device 120 and/or the electronic device 130. Further, by transmitting a plurality of different ABR segment streams associated with the same content from the ABR server 110, the gateway device 120 and/or the electronic device 130 are able to recover or recreate corrupted ABR segments from other uncorrupted ABR segments in the plurality of different ABR segment streams that are received, as described herein in various implementations. Still further, by transmitting the plurality of different ABR segment streams associated with the same content from the ABR server 110 over a shared frequency, all of these benefits are achievable without sacrificing transmission bandwidth (or with minimal to no impact on the bandwidth of the channel), since additional frequencies are not required to transmit additional respective ABR segment streams. That is, all of the different ABR segment streams may be transmitted across the same shared frequency.

In one or more implementations, the gateway device 120 and/or the electronic device 130 may be further configured to provide feedback to the ABR server 110, e.g. with respect to different ABR segment streams that the gateway device 120 and/or the electronic device 130 would like to receive. For example, the gateway device 120 may wish to receive an ABR segment stream encoded with a particular codec, e.g. a codec that is decodable by the electronic devices 102, 104, 106. The ABR server 110 may receive the feedback from the gateway device 120 and/or the electronic device 130 and may modify the ABR segment streams being transmitted to the gateway device 120 and/or the electronic device 130 on a shared frequency.

Figure 2:
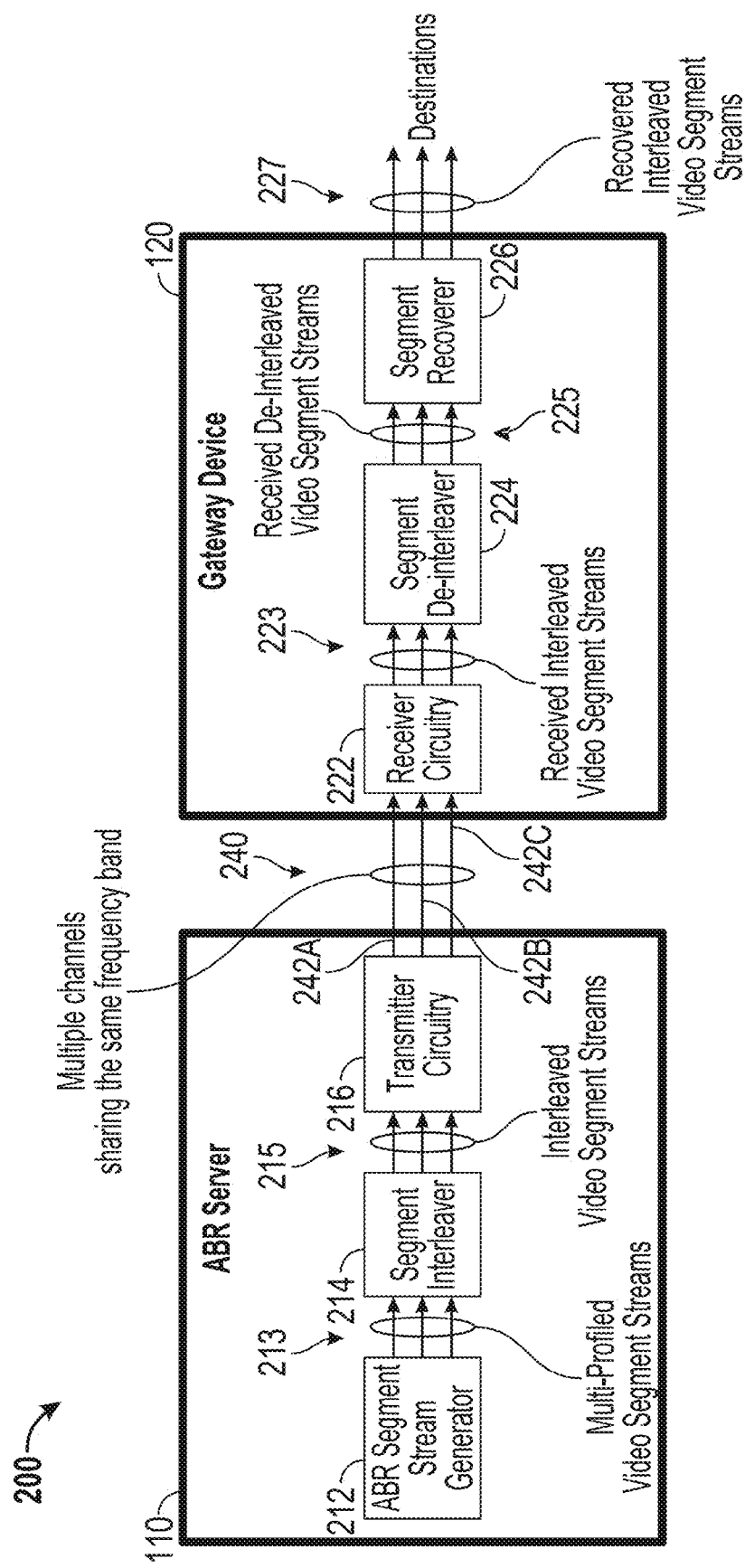
FIG. 2 illustrates an example network environment including an ABR server and a gateway device that may be used in a system for transmitting multiple ABR segment streams on a shared frequency in accordance with one or more implementations.

FIG. 2 illustrates an example network environment 200 including an ABR server 110 and a gateway device 120 that may be used in a system for transmitting multiple ABR segment streams on a shared frequency in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In one or more implementations, the ABR server 110 includes an ABR segment stream generator 212, a segment interleaver 214, and transmitter circuitry 216. The gateway device 120 includes receiver circuitry 222, a segment deinterleaver 224, and a segment recoverer 226. In operation, the ABR segment stream generator 212 encodes a content item into multiple encoded versions, or encoded streams, e.g. based at least in part on different ABR profiles. The ABR segment stream generator 212 may segment the encoded streams to generate ABR segment streams 213. Different ABR segment streams may each include segments that correspond to the same portion of the content item, e.g. a determined duration of the content item, but that are encoded based on different ABR profiles. In one or more implementations, the ABR segment stream generator 212 provides the ABR segment streams to the segment interleaver 214 that interleaves the segments of the ABR segment streams (i.e., modifies the order of the segments in the ABR segment stream) to generate interleaved segment streams 215. For example, the segments of a given ABR segment stream may be interleaved together. As will be described with reference to various implementations herein, the interleaving of the ABR segment streams provides a more robust solution that allows a particular segment to be recreated from other ABR segments that correspond to the same content if the particular segment becomes corrupted. In one or more implementations, the segments of a given ABR segment stream may not be interleaved with the segments of other ABR segment streams. In one or more implementations, the ABR segment streams 213 may not be interleaved and may be provided by the ABR segment stream generator 212 to the transmitter circuitry 216 without modification of the segment order.

The segment interleaver 214 provides the interleaved segment streams to the transmitter circuitry 216. The transmitter circuitry 216 may be configured to process the interleaved segment streams 215, such as modulate the interleaved segment streams 215, pre-code the interleaved segment streams 215, apply orbital angular momentum to the interleaved segment streams 215, combine the interleaved segment streams 215, or generally any processing that may facilitate transmitting the output interleaved segment streams 242A-C over a shared frequency. The transmitter circuitry 216 may also be configured to simultaneously transmit the segment streams 242A-C on a shared frequency 240, to the receiver circuitry 222. For explanatory purposes, three segment streams 242A-C are illustrated as being transmitted simultaneously over the shared frequency 240. However, any number of segment streams may be transmitted over the shared frequency 240.

The receiver circuitry 222 is configured to receive the segment streams 242A-C over the shared frequency 240. The receiver circuitry 222 may be configured to process the received segment streams 242A-C, such as demodulate, separate, remove OAM, etc., to recover the interleaved segment streams 223. The receiver circuitry 222 provides the interleaved segment streams 223 to the segment deinterleaver 224. The segment deinterleaver 224 deinterleaves the interleaved segment streams 223 to recover the ABR segment streams 225 and provides the ABR segment streams 225 to the segment recoverer 226. In one or more implementations, when any of the received segment streams 242A-C was not interleaved, the received segment streams 242A-C may be provided directly to the segment recoverer 226 or may otherwise pass through the segment deinterleaver 224 without any deinterleaving functionality being performed. The segment recoverer 226 determines whether any of the segments of the any of the ABR segment streams 225 were corrupted during transmission and recovers any corrupted segments. The segments 227 of the ABR segment streams may then be rendered, e.g. on a display, transmitted to one or more of the electronic devices 102, 104, 106, or buffered for transmission to one or more of the electronic devices 102, 104, 106, e.g. in a buffer or a memory.

Figure 3:
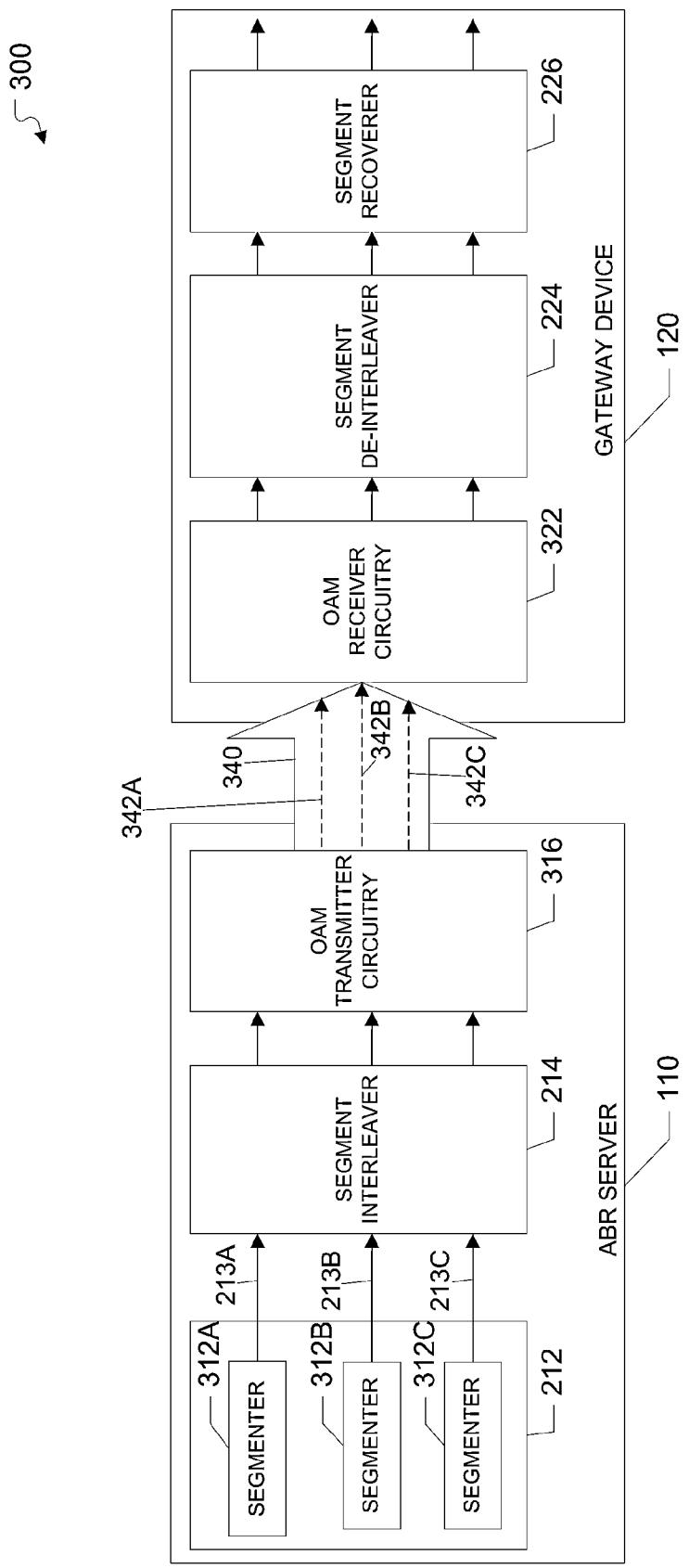
FIG. 3 illustrates an example network environment including an ABR server and a gateway device that are configured to communicate over orbital angular momentum (OAM) channels on a shared frequency in accordance with one or more implementations.

FIG. 3 illustrates an example network environment 300 including an ABR server 110 and a gateway device 120 that are configured to communicate over orbital angular momentum (OAM) channels on a shared frequency in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 300 includes an ABR server 110 and a gateway device 120. The ABR server 110 includes an ABR segment stream generator 212, a segment interleaver 214, and OAM transmitter circuitry 316. The ABR segment stream generator 212 of FIG. 3 includes multiple segmenters 312A-C. The gateway device 120 includes OAM receiver circuitry 322, a segment deinterleaver 224, and a segment recoverer 226.

In operation, the segmenters 312A-C of the ABR segment stream generator 212 generate different respective ABR segment streams 213A-C from a content item that are encoded based at least in part on different ABR profiles. The ABR segment stream generator 212 provides the ABR segment streams to the segment interleaver 214. The segment interleaver 214 interleaves the segment streams and provides the interleaved segment streams to the OAM transmitter circuitry 316. The OAM transmitter circuitry 316 may modulate the interleaved segment streams to generate modulated segment streams. The OAM transmitter circuitry 316 applies different orbital angular momentums, or states, and/or different polarizations, to each of the modulated segment streams to generate OAM channels 342A-C, as is discussed further below with respect to FIG. 5 and FIGS. 14A-C. Thus, the OAM channels 342A-C may carry streams of ABR segments that are encoded based at least in part on different ABR profiles.

The OAM transmitter circuitry 316 may combine the OAM channels 342A-C, such as by multiplexing the OAM channels 342A-C for transmission to the OAM receiver circuitry 322 on a shared frequency 340. In one or more implementations, the OAM transmitter circuitry 316 may combine the OAM channels 342A-C for transmission on a shared frequency 340. In one or more implementations, the OAM channels 342A-C may be combined and/or multiplexed at the time that the orbital angular momentum is applied to the OAM channels 342A-C. For explanatory purposes, only three OAM channels 342A-C are illustrated as being transmitted on the shared frequency 340. However, any number of OAM channels may be generated based on different orbital angular momentums and/or different polarizations, and may be transmitted on the shared frequency 340.

The OAM receiver circuitry 322 may receive the OAM channels 342A-C on the shared frequency 340. The OAM receiver circuitry 322 may process the OAM channels 342A-C, such as by separating the OAM channels 342A-C to recover the interleaved segment streams (or to recover the non-interleaved segment streams in situations where the ABR segment streams were not interleaved by the ABR server 110). The OAM receiver circuitry 322 provides the interleaved segment streams to the segment deinterleaver 224. For explanatory purposes, the OAM receiver circuitry 322 is discussed in the context of the gateway device 120; however, the OAM receiver circuitry 322 may also be included in the electronic device 130 and/or any other suitable device.

Figure 4:
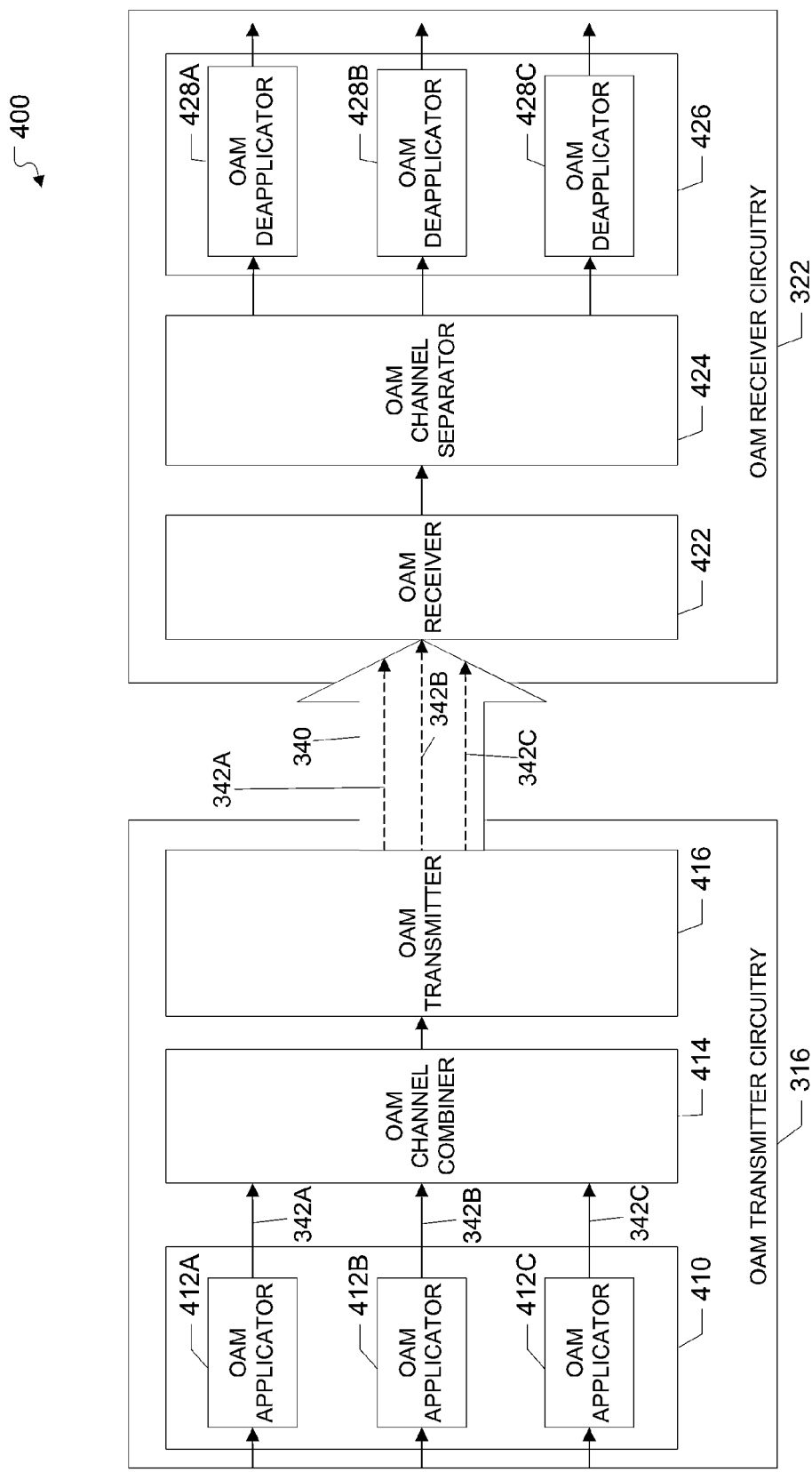
FIG. 4 illustrates an example OAM transmitter/receiver circuitry that may be used in a system for transmitting multiple ABR segment streams on a shared frequency in accordance with one or more implementations.

FIG. 4 illustrates an example OAM transmitter/receiver circuitry 400 that may be used in a system for transmitting multiple ABR segment streams on a shared frequency in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example OAM transmitter/receiver system 400 includes OAM transmitter circuitry 316 and OAM receiver circuitry 322. The OAM transmitter circuitry 316 includes an OAM channel generator 410, an OAM channel combiner 414, and an OAM transmitter 416. The OAM channel generator 410 includes OAM applicators 412A-C. The OAM receiver circuitry 322 includes an OAM receiver 422, an OAM channel separator 424, and an OAM channel remover 426. The OAM channel remover 426 includes OAM deapplicators 428A-C.

In operation, the OAM applicators 412A-C receive segment streams, e.g. interleaved and/or modulated segment streams, and apply orbital angular momentums to the segment streams to generate OAM channels 342A-C. The OAM applicators 412A-C may each be configured to apply a different orbital angular momentum such that each of the OAM channels 342A-C has a different and unique orbital angular momentum associated therewith. There may be infinite orbital angular momentums that can be applied to segment streams, thereby allowing a large number of OAM channels to be created with each of the OAM channels capable of being transmitted over a shared frequency. The different orbital angular momentums may be defined based at least in part on an associated topological charge (l). Three example orbital angular momentums are discussed below with respect to FIGS. 14A-C.

In one or more implementations, an OAM applicator 412A may include a spiral phase mask with a topological charge (l) that is associated with the angular orbital momentum being applied, such as l=−4. The OAM applicator 412A may apply the spiral phase mask to a modulated segment stream (e.g. 16-QAM), to generate an OAM beam, or OAM channel 342A from the modulated segment stream. In one or more implementations, the modulated segment stream may be in the form of an information-carrying Gaussian beam.

In one or more implementations, the OAM channel generator 410 may provide the OAM channels 342A-C to the OAM channel combiner 414, which may combine the OAM channels 342A-C for transmission on a shared frequency. For example, the OAM channel combiner 414 may multiplex the OAM channels 342A-C on a single wavelength using non-polarizing beamsplitters. In one or more implementations, the OAM channel combiner 414 may perform polarization multiplexing on the multiplexed OAM channels 342A-C to further increase capacity and spectral efficiency. In one or more implementations, the OAM channels 342A-C may be multiplexed on a single wavelength when the OAM is applied to the OAM channels 342A-C by the OAM applicators 412A-C, and therefore the OAM channel combiner 414 may not be used. The OAM channel combiner 414 provides the combined OAM channels 342A-C to the OAM transmitter 416. The OAM transmitter 416 transmits the combined OAM channels 342A-C on a shared frequency 340. For example, the OAM transmitter 416 may be coupled to an antenna or an antenna array through which the combined OAM channels 342A-C are transmitted. Example antennas and example antenna arrays are discussed further below with respect to FIGS. 15 and 16.

The OAM receiver 422 may receive the combined OAM channels 342A-C over the shared frequency 340. For example, the OAM receiver 422 may include an antenna or an antenna array through which the combined OAM channels 342A-C are received. The OAM receiver 422 provides the combined OAM channels 342A-C to the OAM channel separator 424. The OAM channel separator 424 separates the combined OAM channels 342A-C to recover the individual OAM channels 342A-C. For example, the OAM channel separator 424 may demultiplex the combined OAM channels 342A-C. In one or more implementations, the OAM channels 342A-C may be demultiplexed when the OAM is removed by the OAM deapplicators 428A-C, and therefore the OAM channel separator 424 may not be used.

The OAM channel separator 424 provides the individual OAM channels 342A-C to the OAM deapplicators 428A-C of the OAM channel remover 426. The OAM deapplicators 428A-C remove the orbital angular momentum from the OAM channels 342A-C to generate the segment streams, e.g. modulated and/or interleaved segment streams. For example, the OAM deapplicator 428A may include a spiral phase mask having a topological charge that is inverse to the topological charge of the OAM applicator 412A. The OAM deapplicator 428A may apply the spiral mask to the OAM channel 342A to remove the orbital angular momentum and recover the modulated and/or interleaved segment streams, e.g. in the form of a Gaussian carrying information beam. The OAM channel remover 426 provides the modulated and/or interleaved segment streams for further processing, e.g. demodulating and/or deinterleaving.

Figure 5:
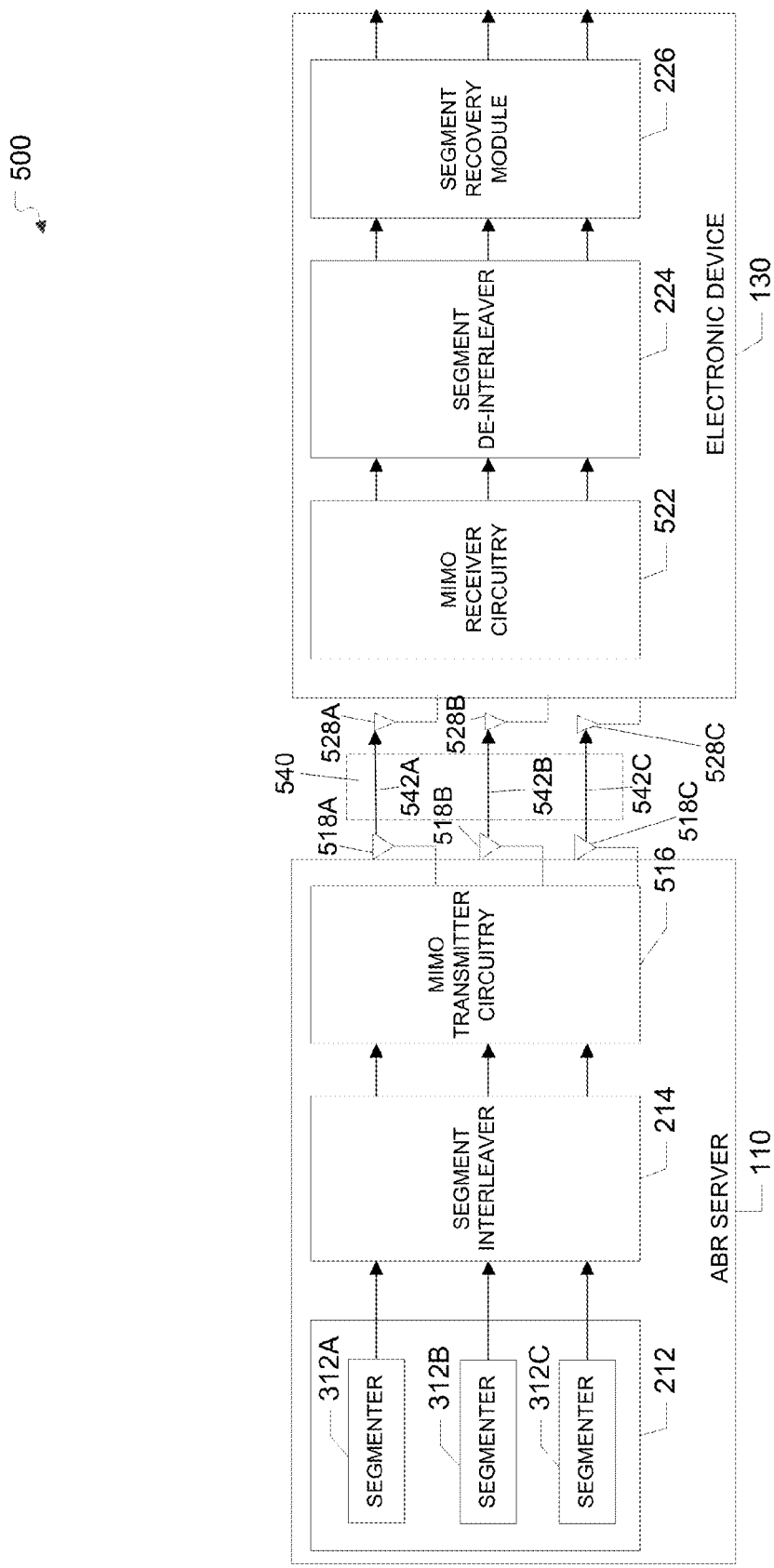
FIG. 5 illustrates an example network environment including an ABR server and a gateway device that are configured to perform multiple-input and multiple output (MIMO) spatial multiplexing on a shared frequency in accordance with one or more implementations.

FIG. 5 illustrates an example network environment 500 including an ABR server 110 and an electronic device 130 that are configured to perform multiple-input and multiple-output (MIMO) spatial multiplexing on a shared frequency in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The ABR server 110 may include an ABR segment stream generator 212, a segment interleaver 214, MIMO transmitter circuitry 516, and one or more spatially separated antennas 518A-C. The MIMO transmitter circuitry 516 may include one or more circuits, such as power amplifiers (PAs), modulators, filters, etc. The electronic device 130 may include MIMO receiver circuitry 522, a segment deinterleaver 224, a segment recoverer 226, and one or more antennas 528A-C. The MIMO receiver circuitry 522 may include one or more circuits, such as power amplifiers (PAs), demodulators, filters, etc.

The MIMO transmitter circuitry 516 may receive the interleaved segment streams from the segment interleaver 214. The MIMO transmitter circuitry 516 may process the interleaved segment streams, such as modulating the interleaved segment streams, precoding the interleaved segment streams, and/or performing other processing that may facilitate using MIMO spatial multiplexing to transmit the interleaved segment streams. The MIMO transmitter circuitry 516 may be coupled to multiple spatially separate antennas 518A-C. In one or more implementations, the antenna 518A may be dedicated to the modulated segment stream 542A, the antenna 518B may be dedicated to the modulated segment stream 542B, and the antenna 518C may be dedicated to the modulated segment stream 542C. The MIMO transmitter circuitry 516 may transmit the modulated segment streams 542A-C on a shared frequency 540 via the spatially separate antennas 518A-C.

The MIMO receiver circuitry 522 may receive one or more signals that carry the modulated segment streams 542A-C through the one or more antennas 528A-C. Although the modulated segment stream 542A is illustrated as being transmitted directly from one antenna 518A to another antenna 528A, any of the antennas 528A-C may receive the modulated segment stream 542A. For example, if the MIMO receiver circuitry 522 is coupled to three antennas 528A-C, any or all of the three antennas 528A-C may receive signals carrying any of the modulated segment streams 542A-C, e.g. all three of the antennas 528A-C may receive signals that carry the modulated segment stream 542A. The MIMO receiver circuitry 522 may recover the modulated segment streams 542A-C from the received signals. The MIMO receiver circuitry 522 may demodulate the modulated segment streams 542A-C and provide the demodulated segment streams to the segment deinterleaver 224. For explanatory purposes, the MIMO receiver circuitry 522 is discussed in the context of the electronic device 130; however, the MIMO receiver circuitry 522 may also be included in the gateway device 120 and/or any other suitable device.

Figure 6:
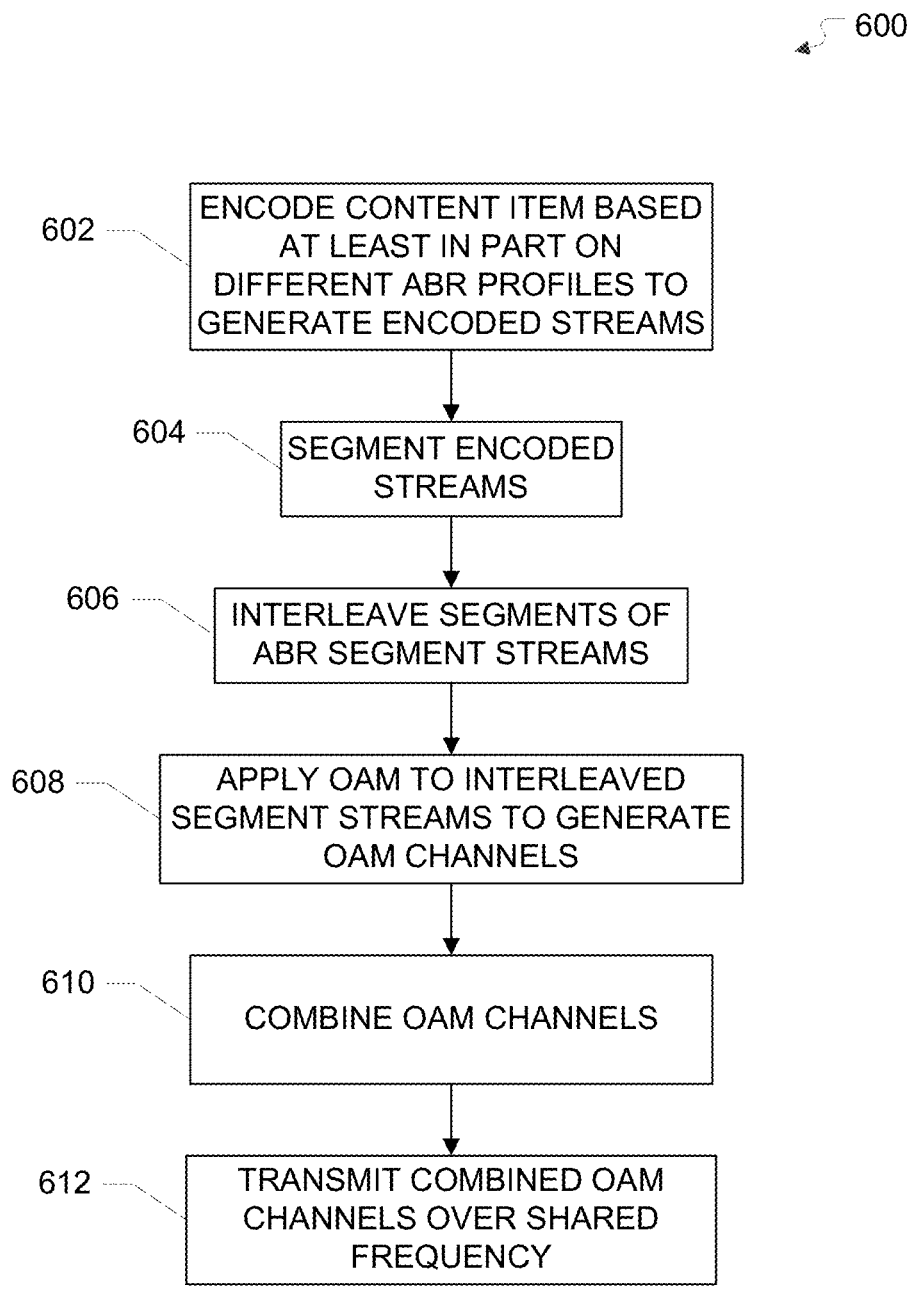
FIG. 6 illustrates a flow diagram of an example process of an ABR server that is configured to transmit multiple ABR segment streams over OAM channels on a shared frequency in accordance with one or more implementations.

FIG. 6 illustrates a flow diagram of an example process 600 of an ABR server 110 that is configured to transmit multiple ABR segment streams over OAM channels on a shared frequency in accordance with one or more implementations. For explanatory purposes, the example process 600 is described herein with reference to the ABR server 110 of the example network environments 100, 200, and 300 of FIGS. 1-3, respectively; however, the example process 600 is not limited to the ABR server 110 of the example network environments 100, 200, and 300 of FIGS. 1-3, respectively, and the example process 600 may be performed by one or more components of the ABR server 110, such as host processors, radio modules, etc. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

The ABR server 110 encodes a content item, e.g. using the segmenters 312A-C, based at least in part on different adaptive bit rate (ABR) profiles to generate different encoded streams (602) for the content item. The ABR profiles may indicate one or more encoding characteristics or parameters that are used by the ABR server 110 to encode the content item, such as bit rate, resolution, frame rate, codec, or generally any encoding characteristics. The ABR server 110 may generate any number of encoded streams from the content item, such as ten or more encoded streams, or generally any number of encoded streams.

The ABR server 110 segments the encoded streams, e.g. using the segmenters 312A-C into multiple segments of a given duration, such as 2-10 seconds, to generate ABR segment streams (604). The encoded streams may be each segmented in the same fashion such that the ABR segment streams each include segments that correspond to the same durations, or portions, of the content item. Thus, each ABR segment stream may include a segment that corresponds to the same portion of the content item, but the segment may be encoded differently for each ABR segment stream, e.g. based at least on the ABR profile that was used to generate the corresponding encoded stream. In one or more embodiments, the ABR segments may alternatively be generated when encoding the content, such that segments are encoded on a segment by segment basis.

The ABR server 110 interleaves each of the segmented streams, for example, using the segment interleaver 214, to generate interleaved segment streams (606). In one or more implementations, blocks of segments of the segmented streams may be interleaved. The segmented streams may be interleaved individually, e.g. such that the segments of a first segmented stream are not interleaved with segments of a second segmented stream. However, in one or more implementations, the segmented streams are interleaved such that the segments of the segmented streams that correspond to the same portion of the content item are not aligned across the interleaved segment streams, to the extent possible. The interleaving of the ABR segment streams provides a more robust solution that allows a particular segment to be recreated from other ABR segments that correspond to the same content if the particular segment becomes corrupted. An example interleaving process is discussed further below with respect to FIG. 11. In one or more implementations, the ABR server 110 may modulate the interleaved segment streams, e.g. using QAM-16. In one or more implementations, the ABR server 110 may not interleave the ABR segment streams.

The ABR server 110 applies different and unique orbital angular momentums, e.g. using the OAM applicators 412A-C, to each of the interleaved segment streams to generate OAM channels 342A-C (608). The ABR server 110 combines the OAM channels 342A-C (610), e.g. using the OAM channel combiner 414, for transmission on a shared frequency 340 (610). In one or more implementations, the OAM channel combiner 414 may multiplex the OAM channels 342A-C over a single wavelength. The ABR server 110 transmits the combined OAM channels 342A-C, e.g. using the OAM transmitter 416, over the shared frequency 340 (612). For example, the combined OAM channels 342A-C may be transmitted over the shared frequency 340 via an antenna system, such as a helicoidal parabolic antenna system or an antenna array. Example antennas and antenna arrays are discussed further below with respect to FIGS. 15 and 16.

Figure 7:
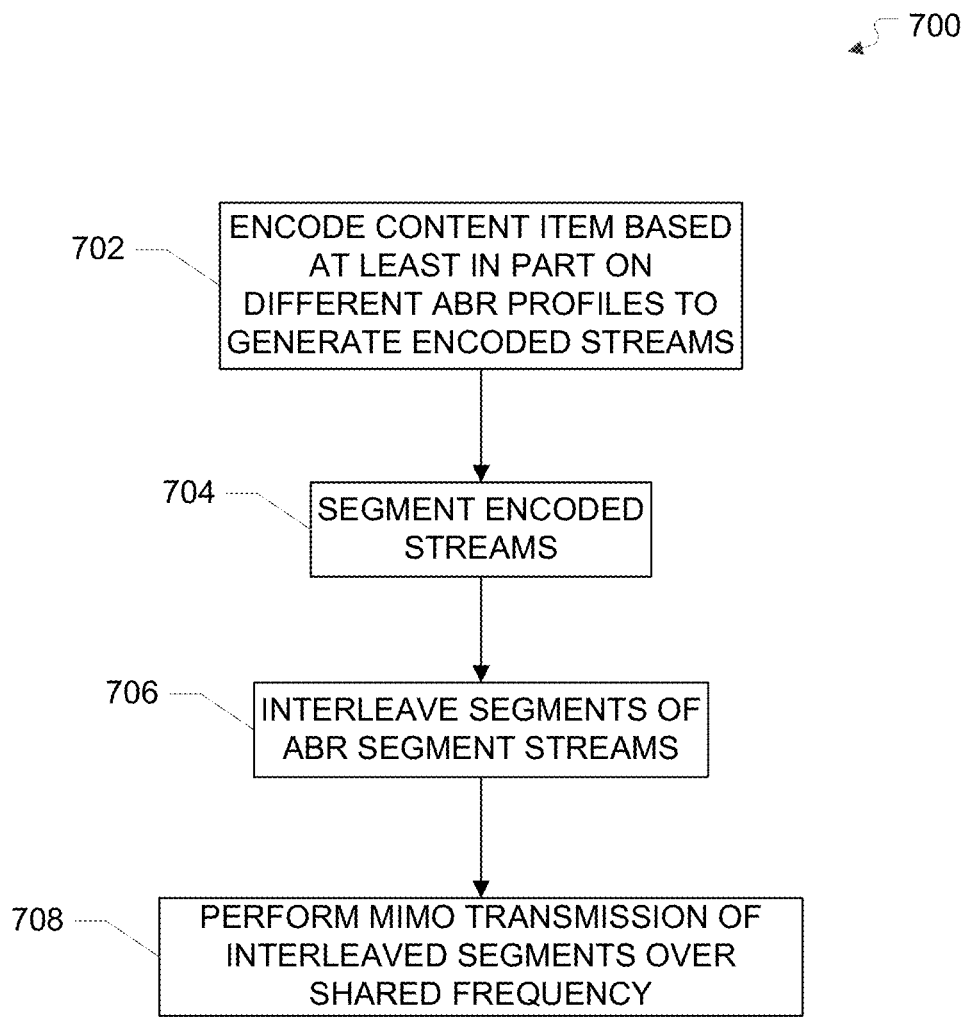
FIG. 7 illustrates a flow diagram of an example process of an ABR server that is configured to transmit multiple ABR segment streams on a shared frequency using MIMO spatial multiplexing in accordance with one or more implementations.

FIG. 7 illustrates a flow diagram of an example process 700 of an ABR server 110 that is configured to transmit multiple ABR segment streams on a shared frequency using MIMO spatial multiplexing in accordance with one or more implementations. For explanatory purposes, the example process 700 is described herein with reference to the ABR server 110 of the example network environments 100, 200, and 500 of FIGS. 1, 2, and 5, respectively; however, the example process 700 is not limited to the ABR server 110 of the example network environments 100, 200, and 500 of FIGS. 1, 2, and 5, respectively, and the example process 700 may be performed by one or more components of the ABR server 110, such as host processors, radio modules, etc. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

The ABR server 110 encodes a content item, e.g. using the segmenters 312A-C, based at least in part on different adaptive bit rate (ABR) profiles to generate different encoded streams (702). The ABR server 110 segments the encoded streams, e.g. using the segmenters 312A-C, into multiple segments of a given duration, such as 2-10 seconds, to generate ABR segment streams (704). The ABR server 110 interleaves each of the segmented streams, such as using the segment interleaver 214, to generate interleaved segment streams (706). The ABR server 110, e.g. using the MIMO transmitter circuitry 516, transmits the interleaved segment streams via the spatially separated antennas 518A-C, e.g. using MIMO spatial multiplexing (708). In one or more implementations, the MIMO transmitter circuitry 516 may process the interleaved segment streams before transmitting the interleaved segment streams, e.g. by modulating the interleaved segment streams, precoding the interleaved segment streams, or generally any processing of the interleaved segment streams that may facilitate transmitting the interleaved segment streams using MIMO spatial multiplexing.

Figure 8:
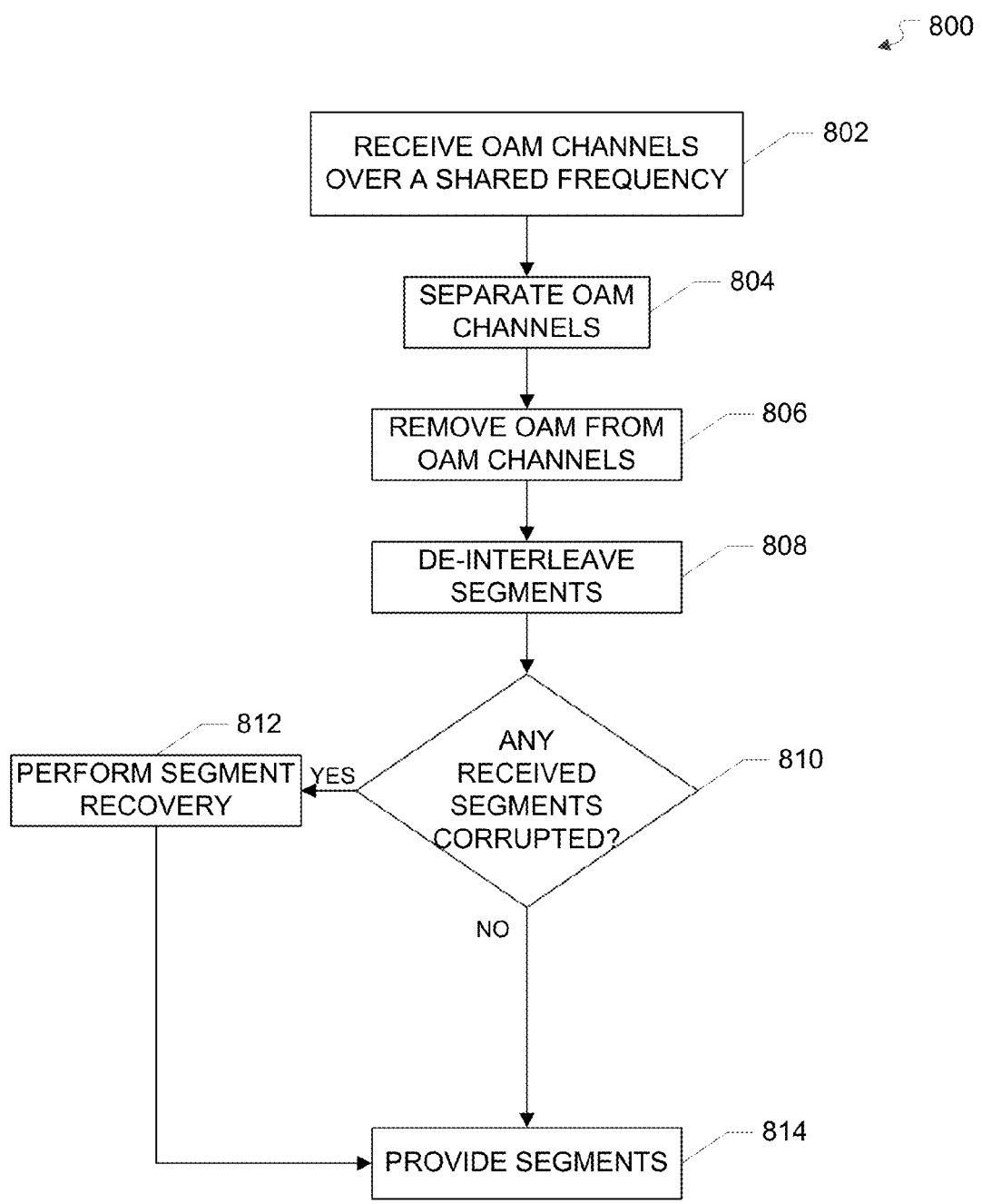
FIG. 8 illustrates a flow diagram of an example process of a gateway device that is configured to receive multiple ABR segment streams over OAM channels on a shared frequency in accordance with one or more implementations.

FIG. 8 illustrates a flow diagram of an example process 800 of a gateway device 120 that is configured to receive multiple ABR segment streams over OAM channels on a shared frequency in accordance with one or more implementations. For explanatory purposes, the example process 800 is described herein with reference to the gateway device 120 of the example network environments 100, 200, and 300 of FIGS. 1-3, respectively; however, the example process 800 is not limited to the gateway device 120 of the example network environments 100, 200, and 300 of FIGS. 1-3, respectively, and the example process 800 may be performed by one or more components of the gateway device 120, such as host processors, radio modules, etc. Further for explanatory purposes, the blocks of the example process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

The gateway device 120 receives the OAM channels 342A-C, e.g. using the OAM receiver 422, on a shared frequency 340 (802). For example, the combined OAM channels 342A-C may be received on the shared frequency 340 via an antenna system, such as a helicoidal parabolic antenna system or an antenna array. In one or more implementations, the OAM channels 342A-C may be multiplexed on a single wavelength. The gateway device 120 separates the OAM channels 342A-C, e.g. using the OAM channel separator 424 (804). For example, the OAM channel separator 424 may demultiplex the OAM channels 342A-C, e.g. from the single wavelength. The gateway device 120 removes the OAM from the OAM channels 342A-C, e.g. using the OAM deapplicators 428A-C, to recover the interleaved segment streams (806). In one or more implementations, the OAM channels 342A-C may be demultiplexed when the OAM is removed by the OAM deapplicators 428A-C, and therefore the separation of the OAM channels (804) may not be performed by the OAM channel separator 424. In one or more implementations, the gateway device 120 may perform further processing to recover the interleaved segment streams, such as demodulation, etc.

The gateway device 120 de-interleaves, e.g. using the segment deinterleaver 224, the interleaved segment streams to recover the ABR segment streams (808). In one or more implementations, the segment streams may be interleaved by the segment interleaver 214 using an interleaving pattern that is known to the segment deinterleaver 224, and/or that is transmitted to the segment deinterleaver 224. The segment deinterleaver 224 may de-interleave the interleaved segment streams based at least in part on the interleaving pattern. In one or more implementations, in those situations where the segment streams were not interleaved, the gateway device 120 will bypass the segment deinterleaver 224 or pass the segment streams through the segment deinterleaver 224 without performing deinterleaving functions.

The gateway device 120 determines whether any of the received segments of the ABR segment streams were corrupted during transmission (810). For example, the gateway device 120 may perform a cyclic redundancy check (CRC) with respect to the received segments, and/or the gateway device 120 may attempt to decode the received segments. If the gateway device 120 determines that any of the received segments was corrupted during transmission (810), the gateway device 120 performs a segment recovery process to recover or recreate the corrupted segment(s) (812). An example segment recovery process is discussed further below with respect to FIG. 10.

If the gateway device 120 determines that all of the segments of the ABR segment streams were received error-free (810), or that any corrupted segments have been recovered (812), the gateway device 120 makes these segments available for ABR streaming. The gateway device 120 may receive requests for segments that are listed in a manifest file, e.g. from the electronic devices 102, 104, 106, and the gateway device 120 may provide the requested segments to the electronic devices 102, 104, 106 (814).

Figure 9:
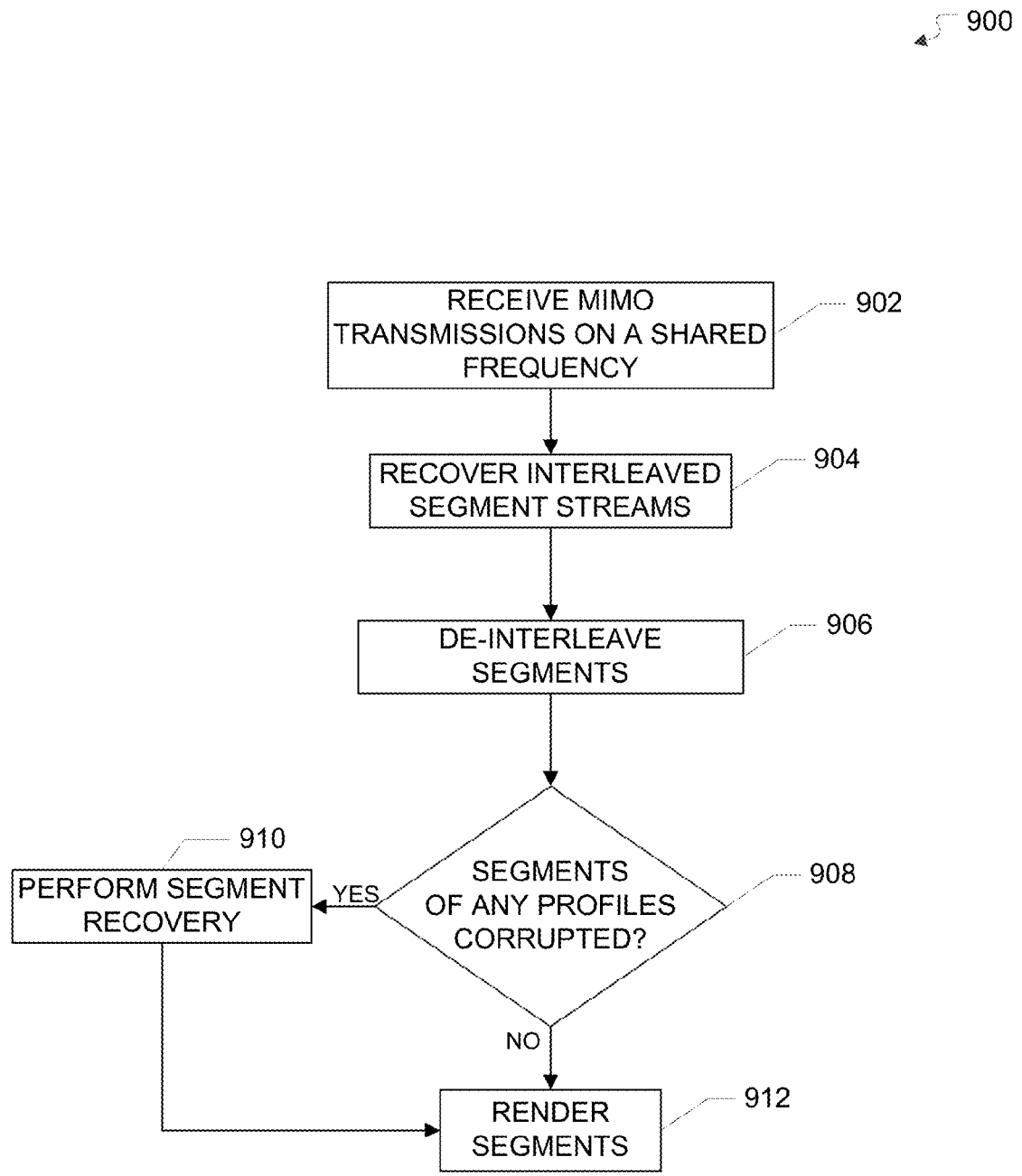
FIG. 9 illustrates a flow diagram of an example process of an electronic device that is configured to receive multiple ABR segment streams on a shared frequency using MIMO spatial multiplexing in accordance with one or more implementations.

FIG. 9 illustrates a flow diagram of an example process 900 of an electronic device 130 that is configured to receive multiple ABR segment streams on a shared frequency using MIMO spatial multiplexing in accordance with one or more implementations. For explanatory purposes, the example process 900 is described herein with reference to the electronic device 130 of the example network environments 100 and 500 of FIGS. 1 and 5, respectively; however, the example process 900 is not limited to the electronic device 130 of the example network environments 100 and 500 of FIGS. 1 and 5, respectively, and the example process 900 may be performed by one or more components of the electronic device 130, such as host processors, radio modules, etc. Further for explanatory purposes, the blocks of the example process 900 are described herein as occurring in serial, or linearly. However, multiple blocks of the example process 900 may occur in parallel. In addition, the blocks of the example process 900 need not be performed in the order shown and/or one or more of the blocks of the example process 900 need not be performed.

The electronic device 130 receives MIMO transmissions, e.g. via the one or more antennas 528A-C, that carry the modulated segment streams 542A-C (902). The electronic device 130 recovers the interleaved segment streams from the received MIMO transmissions (904). For example, the electronic device 130 may recover the modulated segment streams 542A-C from the received MIMO transmissions and may demodulate the modulated segment streams to recover the interleaved segment streams. The electronic device 130 de-interleaves, e.g. using the segment deinterleaver 224, the interleaved segment streams to recover the ABR segment streams (906). In one or more implementations, in those situations where the segment streams were not interleaved, the gateway device 120 will bypass the segment deinterleaver 224 or pass the segment streams through the segment deinterleaver 224 without performing deinterleaving functions.

The electronic device 130 determines whether any of the received segments of the ABR segment streams was corrupted during transmission (908). If the electronic device 130 determines that any of the received segments was corrupted during transmission (908), the electronic device 130 performs a segment recovery process to recover the corrupted segment(s) (910). An example segment recovery process is discussed further below with respect to FIG. 10.

If the electronic device 130 determines whether all of the segments of the ABR segment streams were received error-free (908), or that any corrupted segments have been recovered (910), the electronic device 130 renders the segments of the ABR segment streams in sequence, e.g. on a display, to reproduce the content item (912). The electronic device 130 may seamlessly switch between segments, e.g. based on one or more characteristics determinable by the electronic device 130, such as available power, available processing resources, display size, etc.

Figure 10:
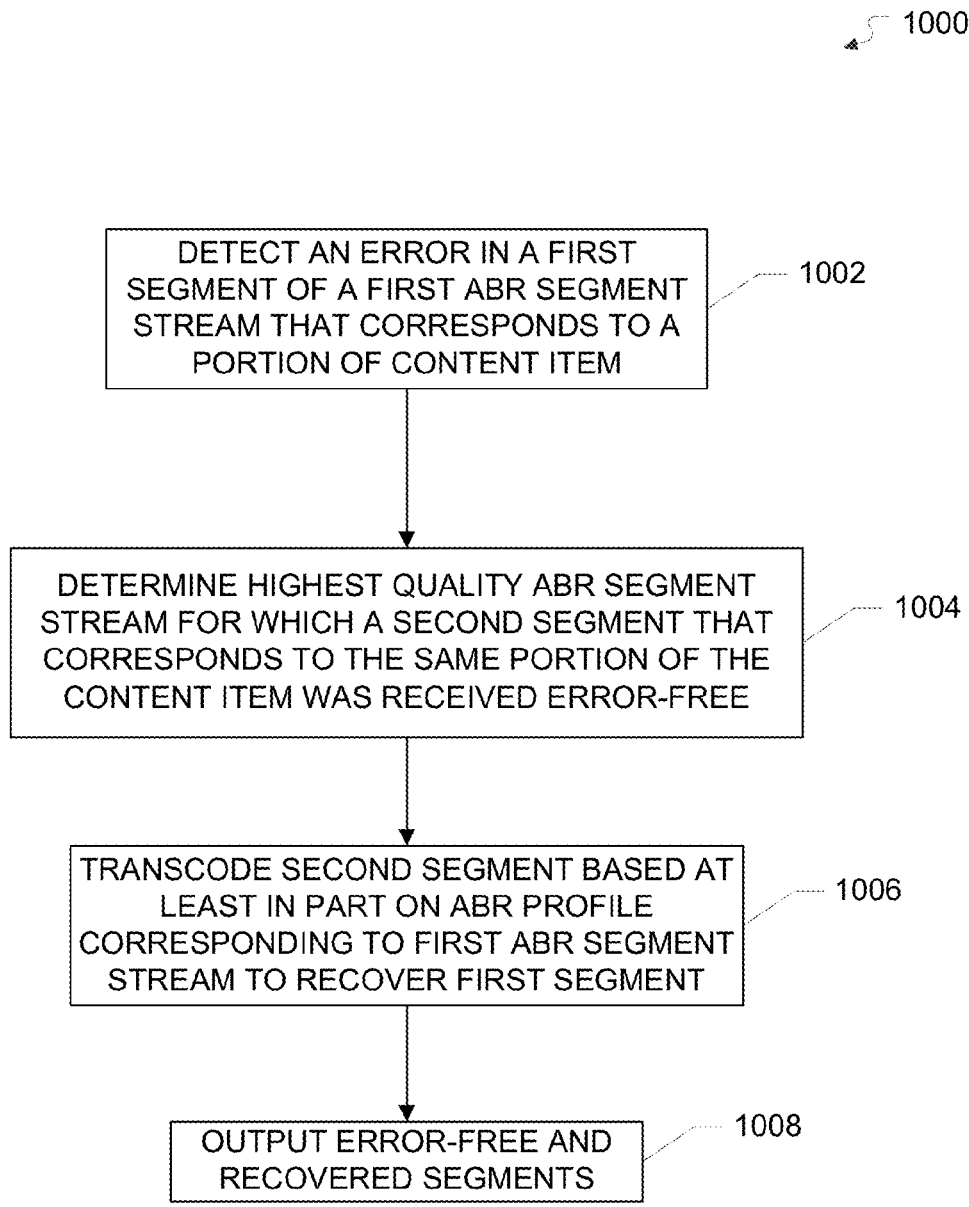
FIG. 10 illustrates a flow diagram of an example process for performing segment recovery in a system for transmitting multiple ABR segment streams on a shared frequency in accordance with one or more implementations.

FIG. 10 illustrates a flow diagram of an example process 1000 for performing segment recovery in a system for transmitting multiple ABR segment streams on a shared frequency in accordance with one or more implementations. In one or more implementations, the example process 1000 for performing segment recovery corresponds to certain operations or actions (908), (910) described in connection with the flow diagram of FIG. 9. For explanatory purposes, the example process 1000 is described herein with reference to the segment recoverer 226 of the gateway device 120 of FIGS. 2 and 3, or of the electronic device 130 of FIG. 5; however, the example process 1000 is not limited to the segment recoverer 226 of the gateway device 120 of FIGS. 2 and 3 or the electronic device 130 of FIG. 5, and the example process 1000 may be performed by one or more other components of the gateway device 120 and/or electronic device 130, such as host processors, radio modules, etc. Further for explanatory purposes, the blocks of the example process 1000 are described herein as occurring in serial, or linearly. However, multiple blocks of the example process 1000 may occur in parallel. In addition, the blocks of the example process 1000 need not be performed in the order shown and/or one or more of the blocks of the example process 1000 need not be performed.

The segment recoverer 226 detects an error exists with the received ABR segment streams. In one or more implementations, the segment recoverer 226 detects such errors by determining whether an error exists in a first segment of a first ABR segment stream that corresponds to a portion of a content item (1002). For example, the segment recoverer 226 may detect the error by performing a CRC check on the first segment or by being unable to decode the first segment. The segments in the first ABR segment stream, including the first segment, may be encoded based at least in part on a first ABR profile, and the first segment may have been received by the gateway device 120 or the electronic device 130 during a first time period or may otherwise be associated with a first time period.

In the event that an error is detected in the first segment of the first ABR segment stream, the segment recoverer 226 determines whether another ABR segment stream contains a segment (i.e., a second segment in this example), that corresponds to the same portion of the content item as the first segment, that was received error-free (1004). In one or more implementations, the other ABR segment stream containing the second segment is an ABR segment stream having the highest bit rate or is an ABR segment stream having properties that allow it to be more easily, efficiently or thoroughly converted to replace the first segment possessing the error. The second segment may be encoded based at least in part on a second ABR profile that is different than the first ABR profile. The second segment may have been received by the gateway device 120 or the electronic device 130 during a second time period or may otherwise be associated with a second time period that is different than the first time period. In one or more implementations, the first and second time periods may be any amount or unit of time, such as a millisecond, a nanosecond, or a Planck unit. In one or more implementations, the segments may be measured in units other than time, such as number of frames, frame markers, content markers or other known manners for partitioning video into segments.

The segment recoverer 226 transcodes the second segment based at least in part on the first ABR profile corresponding to the first ABR segment stream to recover, regenerate or otherwise generate an error-free version of the first segment (1006). In one or more implementations, such transcoding involves decoding the second segment having the second ABR profile and then re-encoding the decoded second segment into an encoded segment having the same first ABR profile corresponding to the first ABR segment stream. The segment recoverer 226 may replace the corrupted first segment in the first ABR segment stream with the recovered/transcoded first segment. The segment recoverer 226 may repeat the error-detecting (1002), determining (1004), and transcoding (1006) for any other corrupted segments. The segment recoverer 226 then outputs the error-free and recovered segments of the ABR segment streams (1008). The ABR segment streams may then be rendered by the gateway device 120 and/or the electronic device 130, and/or may be provided by the gateway device 120 to the electronic devices 102, 104, 106.

Figure 11:
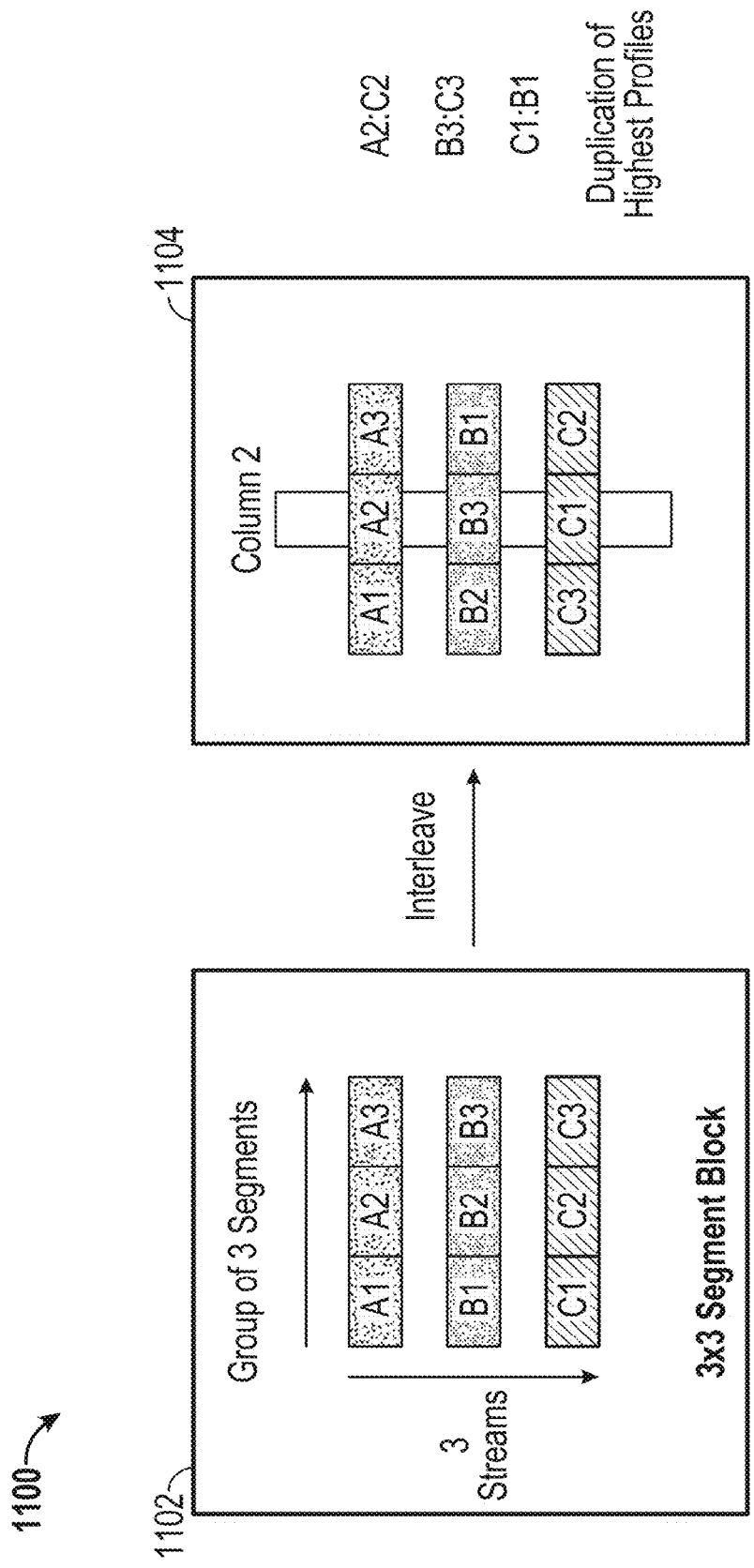
FIG. 11 illustrates an example of segment interleaving in a system for transmitting multiple ABR segment streams on a shared frequency in accordance with one or more implementations.

FIG. 11 illustrates an example of segment interleaving 1100 in a system for transmitting multiple ABR segment streams on a shared frequency in accordance with one or more implementations. The segment interleaving 1100 includes a segment block 1102, e.g. segments of ABR segment streams, and an interleaved segment block 1104, e.g. interleaved segments of ABR segment streams. In FIG. 11, the segments having the same alphabetical prefix, e.g. 'A', 'B', or 'C', are part of the same ABR segment stream. Thus, in this example, the segment block 1102 and the interleaved segment block 1104 may include segments of three ABR segment streams that are encoded based at least in part on three different ABR profiles, e.g. three different bit rates, that are represented by 'A', 'B', and 'C'. In one or more implementations, the ABR segment stream represented by 'C' may be encoded based at least in part on the highest quality ABR profile of the three segment streams, e.g. the highest bit rate, and the ABR segment stream represented by 'A' may be encoded based at least in part on the lowest quality ABR profile of the three segment streams, e.g. the lowest bit rate. In FIG. 11, the segments having the same numerical suffix, e.g. 1, 2, 3, may correspond to the same portion of a content item. For example, segments A1, B1 and C1 all correspond to the same portion of a content item associated with a same first time period, while segments A2, B2 and C2 all correspond to the same portion of a content item associated a same second time period. Thus, the segment block 1102 and the interleaved segment block 1104 may include segments that correspond to three different portions of a content item and the different portions may be represented by the numerical suffixes of 1, 2, and 3.

The segment interleaver 214 organizes each ABR segment stream into groups of N segments and then applies a shuffling (or interleaving) procedure to the segments of each group. For example, if there are M ABR segment streams, the interleaving procedure may be performed on segment blocks of dimension M×N, e.g. to ensure that, after interleaving, a segment of an ABR segment stream corresponding to a portion of the content item in a given column (e.g., time period) has segments corresponding to the same portion of the content item (e.g. from the other ABR segment streams) in other columns (e.g. other time periods). In one or more implementations, the segments of a given column of the interleaved segment block 1104 may be transmitted during the same time period.

Thus, as shown in FIG. 11, the columns of the interleaved segment block 1104 each includes a segment corresponding to a different portion of the content item. For example, the second column includes a segment of the ABR segment stream represented by 'A' that corresponds to the second portion of the content item, a segment of the ABR segment stream represented by 'B' that corresponds to a third portion of the content item, and a segment of the ABR segment stream represented by 'C' that corresponds to the first portion of the content item. Thus, if there is time-selective interference with respect to the shared frequency during the time period when the second column is transmitted, segments that correspond to different portions of the content item may be corrupted. However, since the portion of the content item corresponding to a corrupted segment of a first ABR segment stream may be received error-free during a different time period as a segment of a second ABR segment stream, the segment recoverer 226 may be able to recover the corrupted segment by transcoding the error-free segment. In one or more embodiments, the receiver circuitry 222 in the gateway device 120 or electronic device 130 includes a buffer or memory to store an appropriate number of segments from the various ABR segment streams received in order to account for the interleaved segments and to allow corrupted segments to be transcoded from other corresponding error-free segments that have been received.

Figure 12:
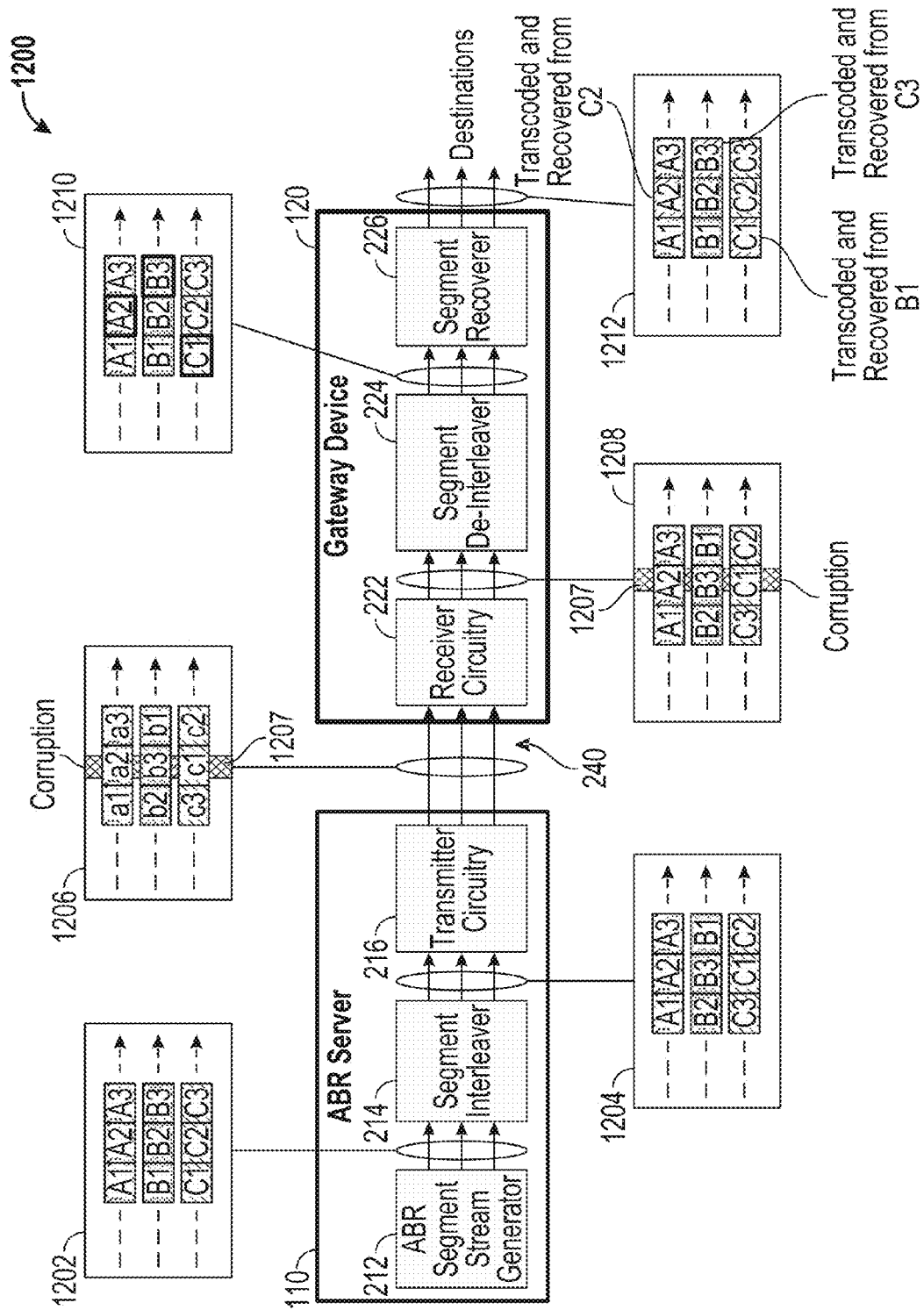
FIG. 12 illustrates an example segment block life cycle in a system for transmitting multiple ABR segment streams on a shared frequency in accordance with one or more implementations.

FIG. 12 illustrates an example of segment block life cycle 1200 in a system for transmitting multiple ABR segment streams on a shared frequency in accordance with one or more implementations. The segment block life cycle 1200 may include a segment block 1202, an interleaved segment block 1204, a transmitted segment block 1206, a received segment block 1208, a deinterleaved segment block 1210, and a recovered segment block 1212. Although the segment block life cycle 1200 is described with respect to a single segment block 1202, in one or more implementations, segment blocks of the ABR segment streams may be continuously generated and transmitted.

As shown in FIG. 12, the ABR segment stream generator 212 outputs three ABR segment streams of content for which three segments of each are grouped into the segment block 1202. The segment interleaver 214 interleaves the segment block 1202 to generate the interleaved segment block 1204. The transmitter circuitry 216 processes the interleaved segment block 1202, e.g. through modulation and/or applying OAM, to generate the transmitted segment block 1206, which is transmitted to the receiver circuitry 222 over the shared frequency. However, in the example illustrated in FIG. 12, time-selective interference is experienced during the transmission of the transmitted segment block 1206, thereby corrupting the segments of the second column 1207.

The receiver circuitry 222 processes the transmitted segment block 1206, e.g. by demodulating, removing OAM, etc., to generate the received segment block 1208. However, the second column 1207 of the received segment block 1208, e.g. A2, B3, and C1, may be corrupted. The segment deinterleaver 224 deinterleaves the received segment block 1208 to generate the deinterleaved segment block 1210. The segments A2, B3, and C1 determined to be corrupted are still present in the deinterleaved segment block 1210; however, the segments are ordered in accordance with the content item (e.g., according to time periods associated with the content item). The segment recoverer 226 recovers the corrupted segments A2, B3, and C1 by transcoding correctly received segments of another ABR segment stream to generate the recovered segment block 1212. The segment recoverer 226 may transcode the correctly received segments of the highest quality ABR segment stream to minimize any quality loss.

For example, since the ABR segment stream represented by 'C' has the highest quality or otherwise possesses characteristics that lend this ABR segment stream to be a desirable choice to transcode into ABR segment stream A, the segment C2 is transcoded based at least in part on the encoding of the ABR segment stream represented by 'A' to recover the segment A2. Similarly, for corrupted segment B3, the segment C3 is transcoded based at least in part on the encoding of the ABR segment stream represented by 'B' to recover the segment B3. Since the segment of the ABR segment stream (e.g., based on highest quality) that corresponds to the first portion of the content item, e.g. C1, was corrupted, a correctly received segment that corresponds to the first portion of the content item and has desirable characteristic (e.g., possesses the next highest quality), e.g. the segment B1, is transcoded to recover the segment C1.

Figure 13:
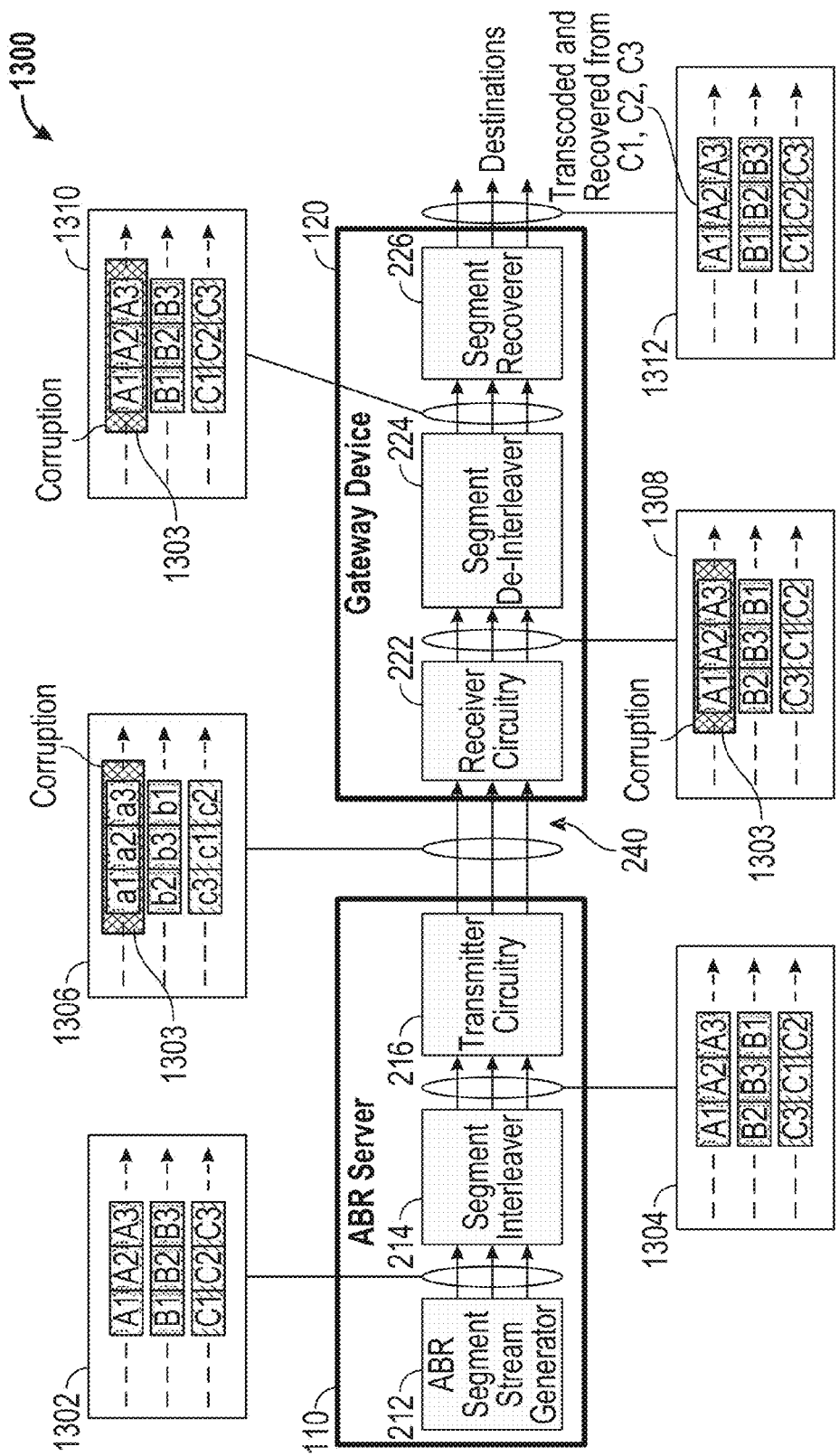
FIG. 13 illustrates an example segment block life cycle in a system for transmitting multiple ABR segment streams on a shared frequency in accordance with one or more implementations.

FIG. 13 illustrates an example of segment block life cycle 1300 in a system for transmitting multiple ABR segment streams on a shared frequency in accordance with one or more implementations. The segment block life cycle 1300 may include a segment block 1302, an interleaved segment block 1304, a transmitted segment block 1306, a received segment block 1308, a deinterleaved segment block 1310, and a recovered segment block 1312. Although the segment block life cycle 1300 is described with respect to a single segment block 1302, in one or more implementations, segment blocks of the ABR segment streams may be continuously generated and transmitted.

As shown in FIG. 13, the ABR segment stream generator 212 outputs three ABR segment streams of content for which three segments of each are grouped into the segment block 1302. The segment interleaver 214 interleaves the segment block 1302 to generate the interleaved segment block 1304. The transmitter circuitry 216 processes the interleaved segment block 1302, e.g. through modulation and/or applying OAM, to generate the transmitted segment block 1306, which is transmitted to the receiver circuitry 222 over the shared frequency. However, in the example of FIG. 13, channel-specific interference is experienced during the transmission of the transmitted segment block 1306, thereby corrupting the segments of the ABR segment stream represented by channel 1303 containing ABR segment stream 'A'.

The receiver circuitry 222 processes the transmitted segment block 1306, e.g. by demodulating, removing OAM, etc., to generate the received segment block 1308. However, the segments of the ABR segment stream represented by 'A' in the received segment block 1308, e.g. A1, A2, and A3, may be corrupted. The segment deinterleaver 224 deinterleaves the received segment block 1308 to generate the deinterleaved segment block 1310. The segments A1, A2, A3 are still corrupted in the deinterleaved segment block 1310; however, the segments are ordered in accordance with the content item (e.g., according to time periods associated with the content item). The segment recoverer 226 recovers the corrupted segments A1, A2, and A3 by transcoding correctly received segments of another ABR segment stream to generate the recovered segment block 1312. The segment recoverer 226 may transcode the correctly received segments of the highest quality ABR segment stream (or ABR segment stream otherwise possessing characteristics that lend it to be a desirable choice to transcode into ABR segment stream A) to minimize any quality loss, e.g. the segments corresponding of the ABR segment stream represented by 'C'.

Figure 14B:
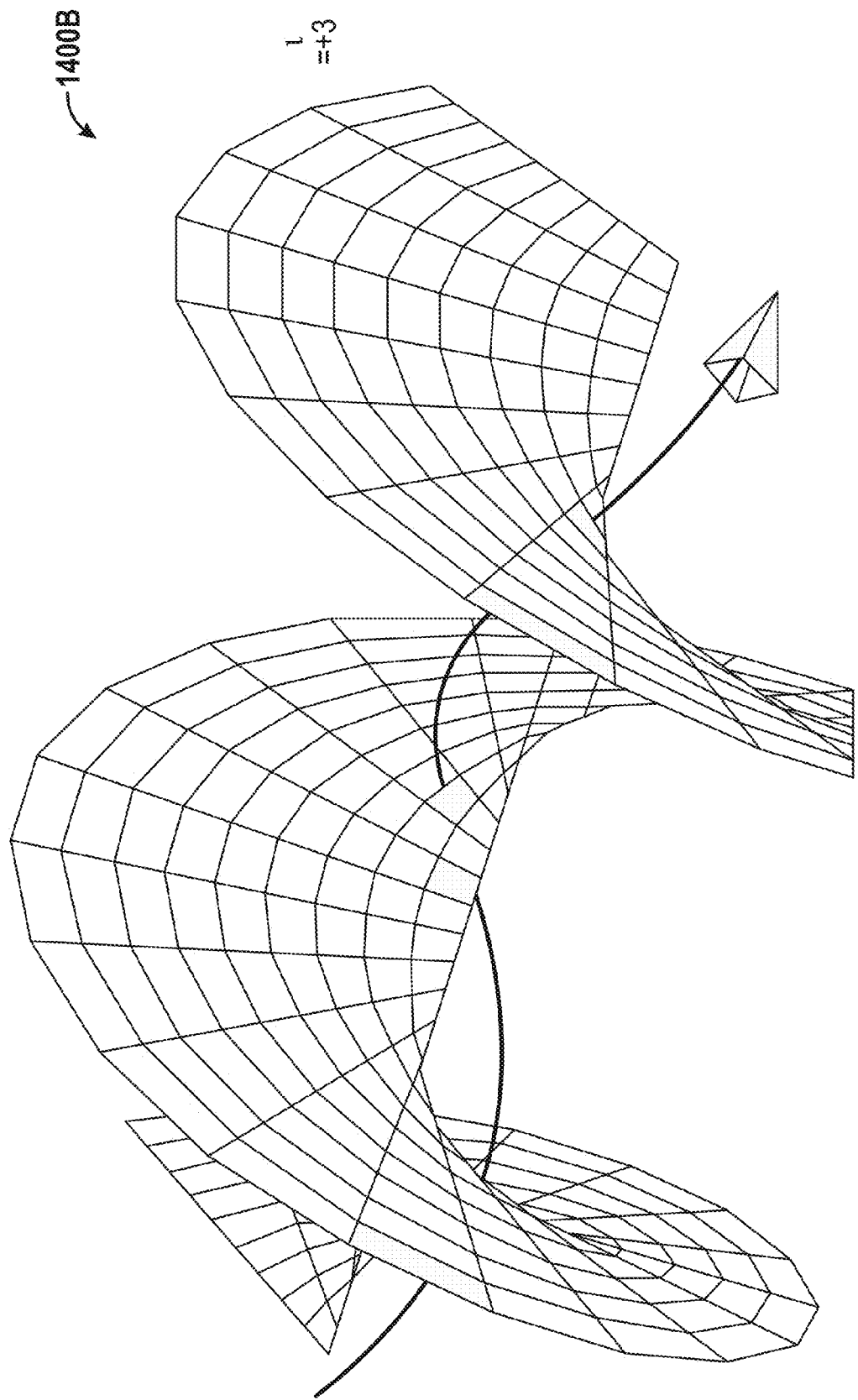
Figure 14C:
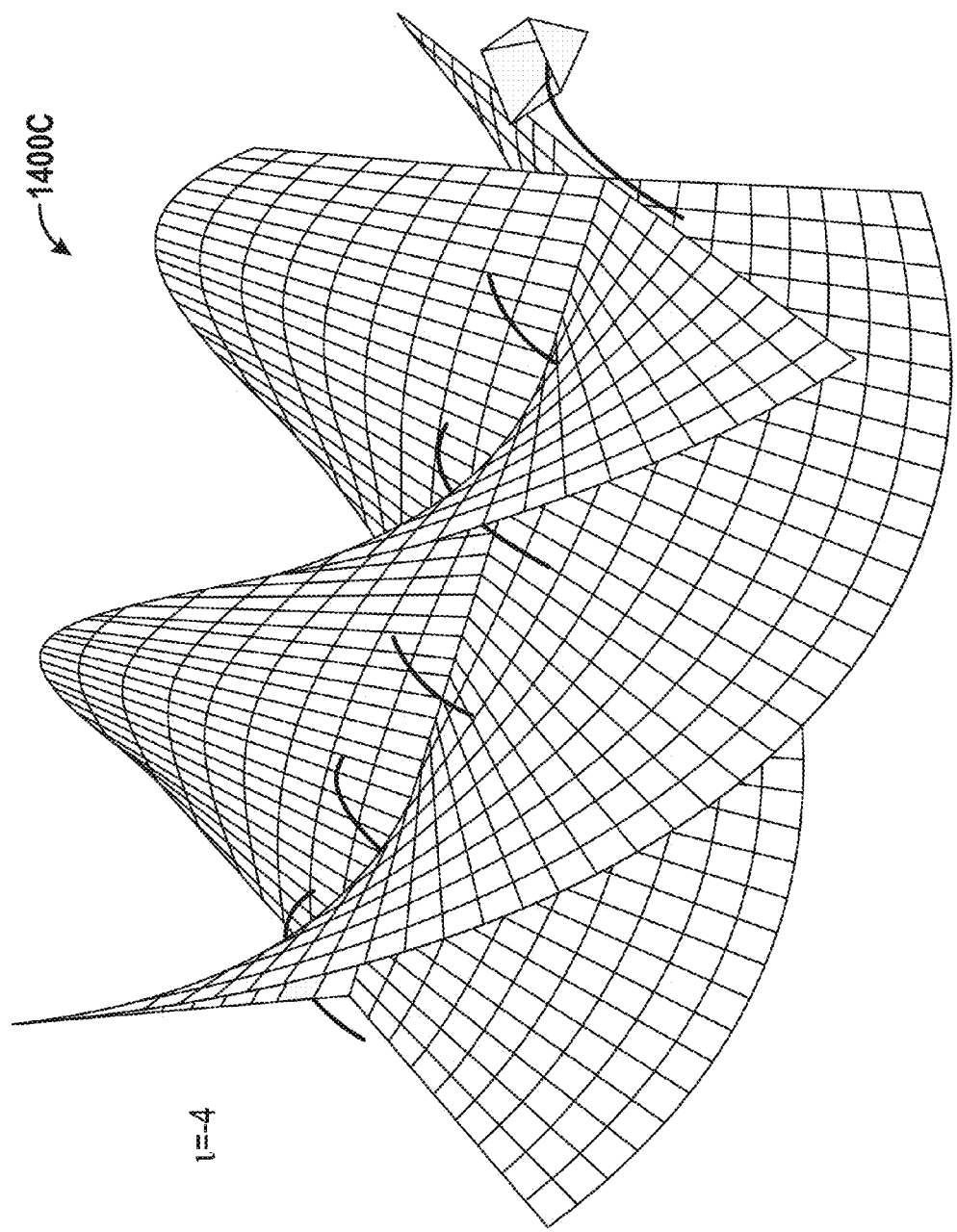

FIGS. 14A-C illustrate examples of OAM channels 1400A-C having different orbital angular momentums that may be transmitted on a shared frequency in accordance with the various embodiments and implementations described herein. In one or more implementations, the OAM channel 1400A may have an orbital angular momentum corresponding to a topological charge of +1 and may be generated by applying a signal to a spiral phase mask having a topological charge of +1, as illustrated in FIG. 14A. The OAM channel 1400B illustrated in FIG. 14B may have an orbital angular momentum corresponding to a topological charge of +3 and may be generated by applying a signal to a spiral phase mask having a topological charge of +3. The OAM channel 1400C illustrated in FIG. 14C may have an orbital angular momentum corresponding to a topological charge of −4 and may be generated by applying a signal to a spiral phase mask having a topological charge of −4. Since the OAM channels 1400A-C have different orbital angular momentums the OAM channels 1400A-C do not interfere with each other when transmitted over a shared frequency. Furthermore, since the OAM channels 1400A-C have different orbital angular momentums, the OAM channels 1400A-C can be distinguished from one another by a receiving device when transmitted on a shared frequency. This allows multiple, and potentially a large number of, OAM channels to be transmitted over a shared frequency so that multiple different ABR segment streams having different ABR profiles can be transmitted without requiring different frequencies for each ABR segment stream.

Figure 15:
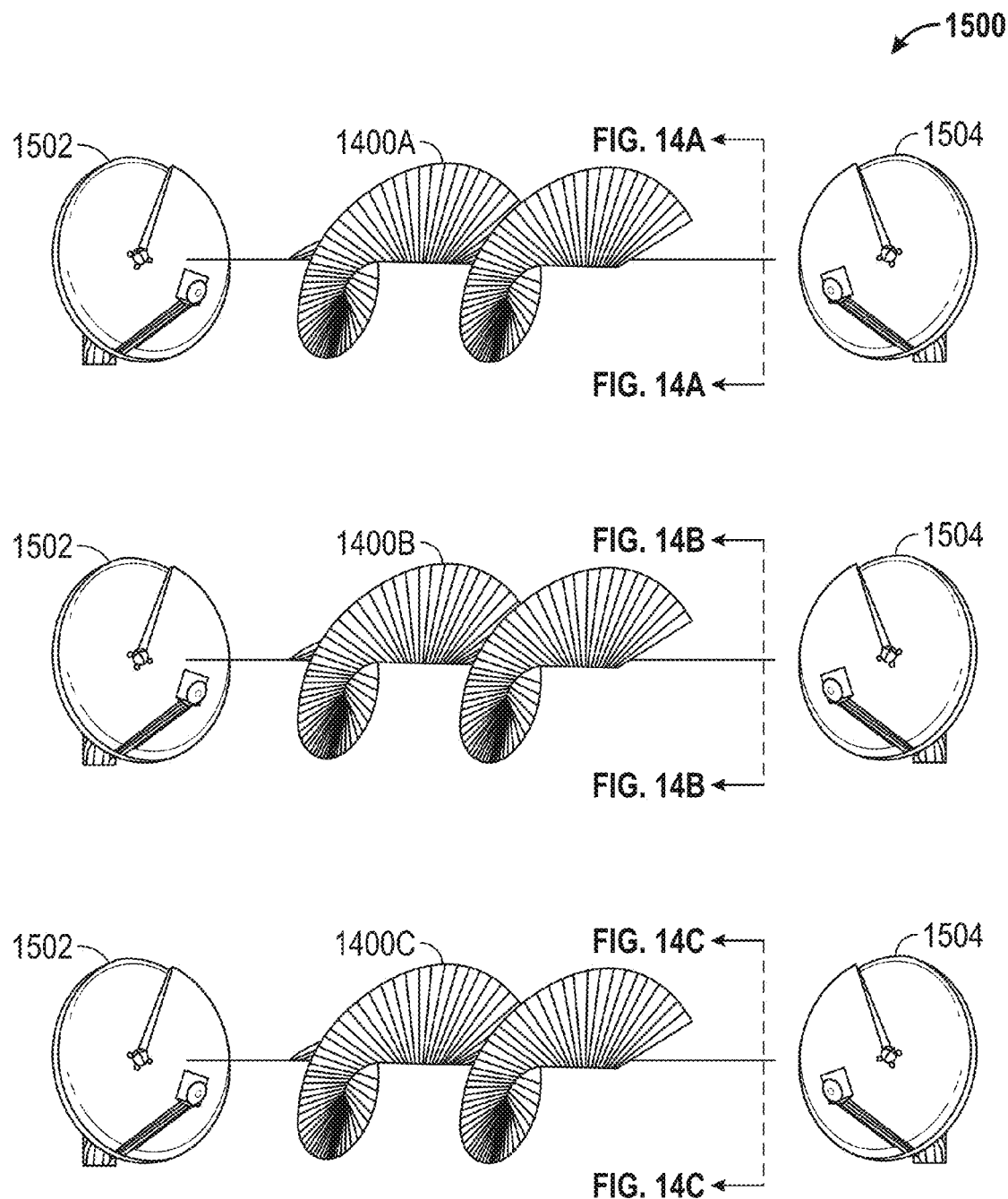
FIG. 15 illustrates a wireless network environment that includes antenna structures that may be used for generating/transmitting and/or detecting/receiving OAM channels in accordance with one or more implementations.

FIG. 15 illustrates a wireless network environment 1500 that includes antenna structures 1502, 1504 that may be used for generating/transmitting and/or detecting/receiving OAM channels in accordance with one or more implementations. The wireless network environment 1500 may include transmitter antenna structures 1502 and receiver antenna structures 1504. The antenna structures 1502, 1504 may be helicoidal parabolic antennas that may be formed from transforming a parabolic dish antenna into a vortex reflector by properly elevating the dish surface with respect to the azimuthal angle. This may be visualized by cutting a radius in a dish and flexing the dish on one side of the cut relative to the other side perpendicular to the dish surface. Accordingly, a helicoidal transmission signal with an orbital angular momentum associated with the helicoidal parabolic antenna may be generated. In one or more implementations, other antenna structures may be used for the transmission and/or reception of OAM channels. As shown in FIG. 15, the OAM channels 1400A-C of FIGS. 14A-C may be transmitted by the antenna structures 1502 and received by the antenna structures 1504. In one or more implementations, the OAM channels 1400A-C may be co-existed in the transmission.

Figure 16:
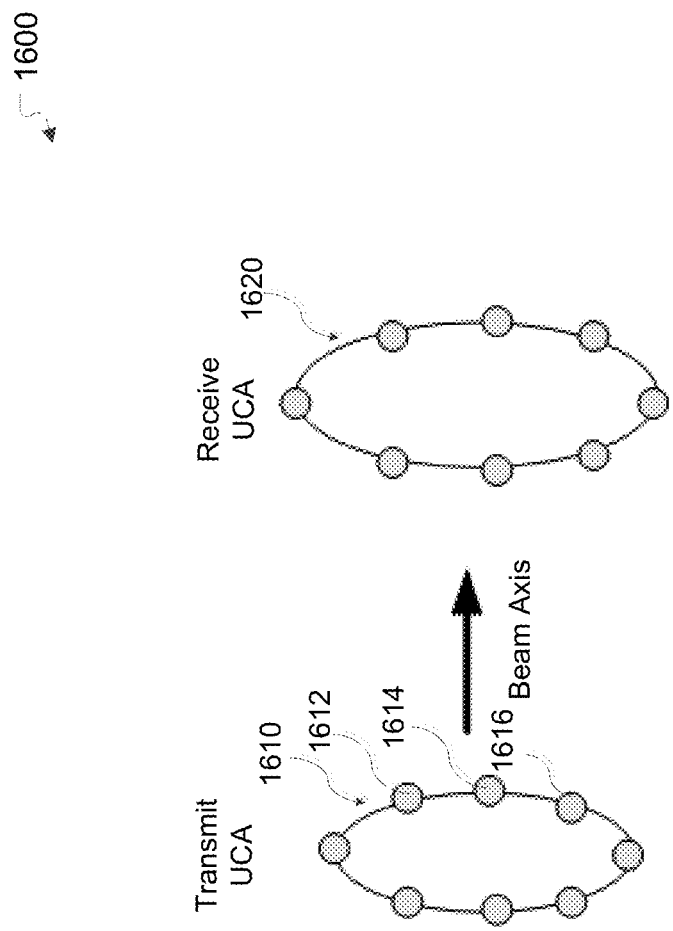
FIG. 16 illustrates a wireless network environment that includes antenna arrays that may be used for generating/transmitting and/or detecting/receiving OAM channels in accordance with one or more implementations.

FIG. 16 illustrates a wireless network environment 1600 that includes antenna arrays 1610, 1620 that may be used for generating/transmitting and/or detecting/receiving OAM channels in accordance with one or more implementations. The transmit antenna array 1610 and/or the receive antenna array 1620 may be uniform circular arrays (UCAs). The transmit antenna array 1610 may include a number of antenna elements (e.g. 1612, 1614, 1616) that are evenly spaced along a circle. For the generation/transmission of OAM-like channels, the antenna elements in the transmit antenna array 1610 are fed with the identical input signal, but with a successive phase delay from element 1612 to element 1616. The OAM channels may be decoded by a receiving device, such as the gateway device 120, with proper processing of the received signals in all antenna elements of the receive antenna array 1620. For explanatory purposes, the antenna arrays 1610, 1620 are illustrated in FIG. 16 as having 8 antenna elements; however, the antenna arrays 1610, 1620 may have any number of antenna elements. In one or more implementations, combinations of different types of transmitting and receiving antennas may be used, such combinations of the antenna structures 1502, 1504 and the antenna arrays 1610, 1620.

Figure 17:
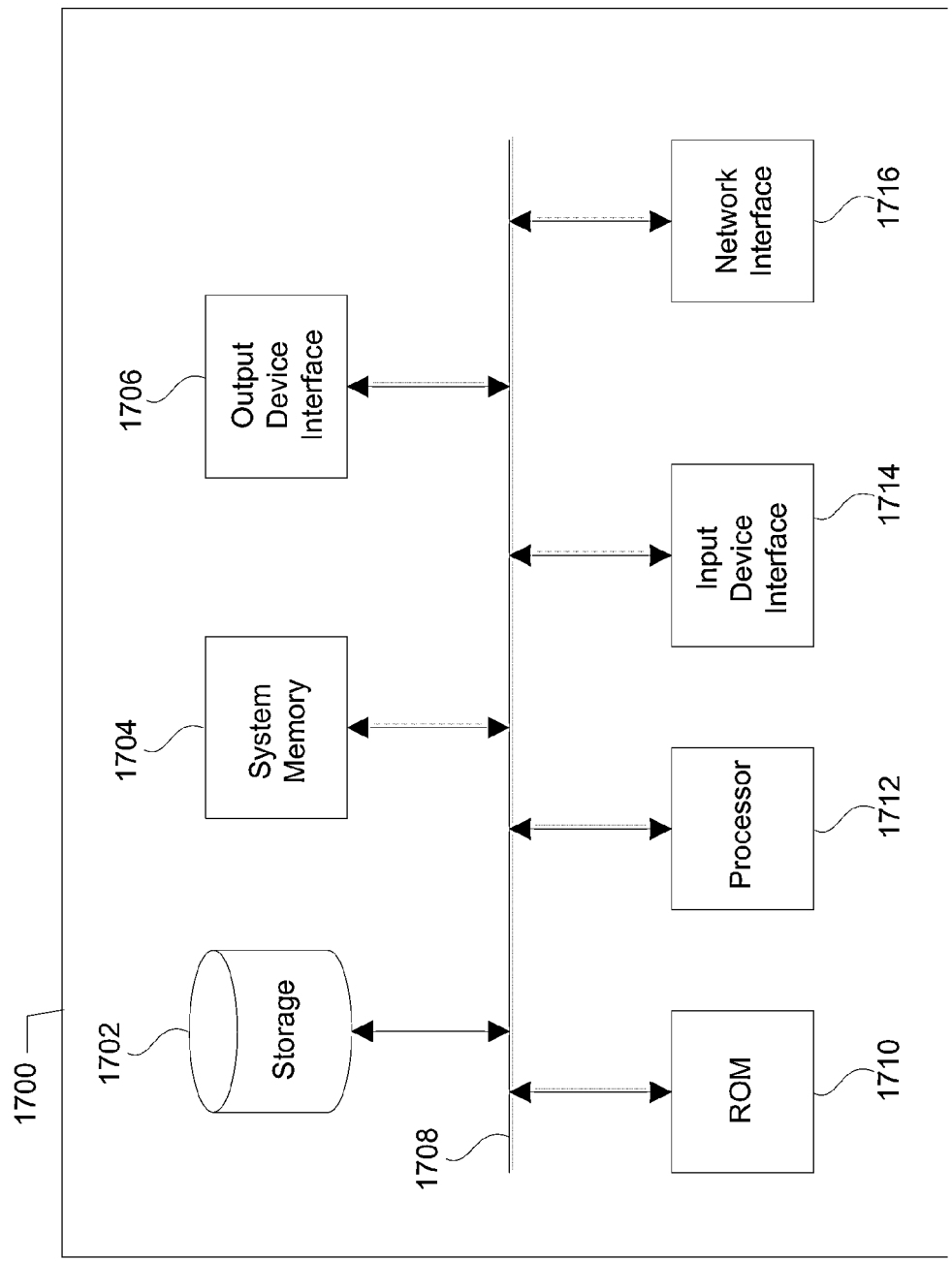
FIG. 17 conceptually illustrates an electronic system with which one or more implementations of the subject technology may be implemented.

FIG. 17 conceptually illustrates an electronic system 1700 with which one or more implementations of the subject technology may be implemented. The electronic system 1700, for example, can be a desktop computer, a laptop computer, a tablet computer, a server, a switch, a router, a base station, a receiver, a phone, a personal digital assistant (PDA), or generally any electronic device that transmits signals over a network. The electronic system 1700 can be, and/or can be a part of, the ABR server 110, the gateway device 120, and/or one or more of the electronic devices 102, 104, 106, 130. Such an electronic system includes various types of computer readable media and interfaces for various other types of computer readable media. The electronic system 1700 includes a bus 1708, one or more processing unit(s) 1712, a system memory or buffer 1704, a read-only memory (ROM) 1710, a permanent storage device 1702, an input device interface 1714, an output device interface 1706, and a network interface 1716, or subsets and variations thereof.

The bus 1708 collectively represents all system, peripheral, and chipset buses that communicatively connect the numerous internal devices of the electronic system 1700. In one or more implementations, the bus 1708 communicatively connects the one or more processing unit(s) 1712 with the ROM 1710, the system memory 1704, and the permanent storage device 1702. From these various memory units, the one or more processing unit(s) 1712 retrieves instructions to execute and data to process in order to execute the processes of the subject disclosure. The one or more processing unit(s) 1712 can be a single processor or a multi-core processor in different implementations.

The ROM 1710 stores static data and instructions that are needed by the one or more processing unit(s) 1712 and other modules of the electronic system 1700. The permanent storage device 1702, on the other hand, may be a read-and-write memory device. The permanent storage device 1702 may be a non-volatile memory unit that stores instructions and data even when the electronic system 1700 is off. In one or more implementations, a mass-storage device (such as a magnetic or optical disk and its corresponding disk drive) may be used as the permanent storage device 1702.

In one or more implementations, a removable storage device (such as a floppy disk, flash drive, and its corresponding disk drive) may be used as the permanent storage device 1702. Like the permanent storage device 1702, the system memory 1704 may be a read-and-write memory device. However, unlike the permanent storage device 1702, the system memory 1704 may be a volatile read-and-write memory, such as random access memory. The system memory 1704 may store any of the instructions and data that one or more processing unit(s) 1712 may need at runtime. In one or more implementations, the processes of the subject disclosure are stored in the system memory 1704, the permanent storage device 1702, and/or the ROM 1710. From these various memory units, the one or more processing unit(s) 1712 retrieves instructions to execute and data to process in order to execute the processes of one or more implementations.

The bus 1708 also connects to the input and output device interfaces 1714 and 1706. The input device interface 1714 enables a user to communicate information and select commands to the electronic system 1700. Input devices that may be used with the input device interface 1714 may include, for example, alphanumeric keyboards and pointing devices (also called "cursor control devices"). The output device interface 1706 may enable, for example, the display of images generated by electronic system 1700. Output devices that may be used with the output device interface 1706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 17, the bus 1708 also couples the electronic system 1700 to a network (not shown) through the network interface 1716. In this manner, the electronic system 1700 can be a part of a network of computers (such as a local area network ("LAN"), a wide area network ("WAN"), or an Intranet, or a network of networks, such as the Internet. Any or all components of the electronic system 1700 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for transmitting multiple adaptive bit rate (ABR) segment streams on a shared frequency, the method comprising:
   encoding a content item based at least in part on a plurality of ABR profiles to generate a plurality of encoded streams, each of the plurality of encoded streams being encoded differently and each of the plurality of encoded streams corresponding to one of the plurality of ABR profiles;
   segmenting the plurality of encoded streams to generate a plurality of ABR segment streams, each of the plurality of ABR segment streams corresponding to one of the plurality of encoded streams; and
   transmitting the plurality of ABR segment streams on the shared frequency to an electronic device irrespective of whether any of the plurality of ABR segment streams have been requested by the electronic device, wherein at least two of the plurality of ABR segment streams are transmitted on the shared frequency to the electronic device simultaneously.

2. The method of claim 1, wherein transmitting the plurality of ABR segment streams on the shared frequency further comprises:
   modulating the plurality of ABR segment streams to generate a plurality of modulated streams; and
   transmitting, via a plurality of spatially separated antennas, the plurality of modulated streams on the shared frequency, wherein each of the plurality of modulated streams is transmitted via one of the plurality of spatially separated antennas.

3. The method of claim 1, wherein transmitting the plurality of ABR segment streams on the shared frequency further comprises:
   generating a plurality of orbital angular momentum channels from the plurality of ABR segment streams; and
   transmitting the plurality of orbital angular momentum channels on the shared frequency.

4. The method of claim 3, wherein generating the plurality of orbital angular momentum channels from the plurality of ABR segment streams further comprises:
   modulating the plurality of ABR segment streams to generate a plurality of modulated streams; and
   applying one of a plurality of orbital angular momentums to each of the plurality of modulated streams to generate the plurality of orbital angular momentum channels, wherein a different orbital angular momentum is applied to each of the plurality of modulated streams.

5. The method of claim 1, further comprising:
   interleaving the plurality of ABR segment streams to generate a plurality of interleaved segment streams.

6. The method of claim 5, wherein transmitting the plurality of ABR segment streams on the shared frequency further comprises:

transmitting the plurality of interleaved segment streams on the shared frequency.

7. The method of claim 1, wherein each of the plurality of ABR profiles indicates at least one of a bit rate, a resolution, a frame rate, or a codec.

8. A method for receiving adaptive bit rate (ABR) segment streams on a shared frequency, the method comprising:
receiving, by an electronic device, a plurality of ABR segment streams concurrently on the shared frequency, wherein each of the plurality of ABR segment streams comprises a plurality of segments of a content item that are encoded based at least in part on one of a plurality of ABR profiles and each of the plurality of ABR segment streams is encoded differently; and
selecting, by the electronic device, one of the plurality of ABR segment streams for display based at least in part on a characteristic determinable by the electronic device.

9. The method of claim 8, wherein the characteristic determinable by the electronic device comprises at least one of: a codec that is available to the electronic device, power that is available to the electronic device, processing resources that are available to the electronic device, or a size of a display that is available to the electronic device.

10. The method of claim 8, further comprising:
transmitting an indication of the plurality of ABR profiles to a plurality of electronic devices;
receiving, from an electronic device of the plurality of electronic devices, a request for one of the plurality of segments of one of the plurality of ABR segment streams; and
transmitting the one of the plurality of segments of the one of the plurality of ABR segment streams to the electronic device of the plurality of electronic devices.

11. The method of claim 8, wherein receiving the plurality of ABR segment streams on the shared frequency further comprises:
receiving, via a plurality of spatially separated antennas, a plurality of modulated streams on the shared frequency; and
demodulating the plurality of modulated streams to recover the plurality of ABR segment streams.

12. The method of claim 8, wherein receiving the plurality of ABR segment streams on the shared frequency further comprises:
receiving a plurality of orbital angular momentum channels on the shared frequency, wherein each of the plurality of orbital angular momentum channels comprises one of a plurality of orbital angular momentums;
separating each of the plurality of orbital angular momentum channels to generate a plurality of modulated streams; and
demodulating the plurality of modulated streams to generate the plurality of ABR segment streams.

13. The method of claim 8, wherein the plurality of segments of each of the plurality of ABR segment streams are interleaved and the method further comprising:
deinterleaving the plurality of segments of each of the plurality of ABR segment streams.

14. The method of claim 13, further comprising:
determining that a segment of the plurality of segments of a first ABR segment stream of the plurality of ABR segment streams is corrupted; and
recovering the corrupted segment of the plurality of segments of the first ABR segment stream of the plurality of ABR segment streams based at least in part on a corresponding segment of a second ABR segment stream of the plurality of ABR segment streams.

15. The method of claim 14, wherein recovering the segment of the plurality of segments of the first ABR segment stream of the plurality of ABR segment streams based at least in part on the corresponding segment of the second ABR segment stream of the plurality of ABR segment streams further comprises:
transcoding the corresponding segment of the second ABR segment stream of the plurality of ABR segment streams to recover an uncorrupted version of the segment of the plurality of segments of the first ABR segment stream that was determined to have been corrupted.

16. The method of claim 15, wherein the second ABR segment stream of the plurality of ABR segment streams comprises a highest bit rate of the plurality of ABR segment streams for which the corresponding segment was received error-free.

17. The method of claim 8, wherein each of the plurality of ABR profiles indicates at least one of a bit rate, a resolution, a frame rate, or a codec.

18. A device for transmitting multiple adaptive bit rate (ABR) segment streams on a shared frequency, the device comprising:
an ABR segment stream generator configured to encode a content item based at least in part on a plurality of ABR profiles to generate a plurality of encoded streams, each of the plurality of encoded streams being encoded differently, and to segment the plurality of encoded streams to generate a plurality of ABR segment streams; and
a transmitter configured to simultaneously transmit the plurality of ABR segment streams on the shared frequency to an electronic device.

19. The device of claim 18, further comprising:
a plurality of orbital angular momentum (OAM) applicators configured to apply one of a plurality of orbital angular momentums to each of the plurality of ABR segment streams to generate a plurality of OAM channels,
wherein the transmitter is configured to transmit the plurality of OAM channels on the shared frequency.

20. The device of claim 19, wherein a different orbital angular momentum is applied to each of the plurality of ABR segment streams.

21. The device of claim 18, further comprising:
a plurality of spatially separated antennas; and
a plurality of modulators configured to modulate the plurality of ABR segment streams to generate a plurality of modulated streams,
wherein the transmitter is configured to transmit, via a plurality of spatially separated antennas, the plurality of modulated streams on the shared frequency, wherein each of the plurality of modulated streams is transmitted via one of the plurality of spatially separated antennas.

22. The device of claim 18, further comprising:
a segment interleaver configured to interleave the plurality of ABR segment streams to generate a plurality of interleaved segment streams,
wherein the transmitter is configured to transmit the plurality of interleaved segment streams on the shared frequency.

* * * * *